US012645169B2

(12) United States Patent
Yuyama

(10) Patent No.: US 12,645,169 B2
(45) Date of Patent: Jun. 2, 2026

(54) IMAGE FORMING APPARATUS

(71) Applicant: CANON KABUSHIKI KAISHA, Tokyo (JP)

(72) Inventor: Tomonori Yuyama, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/987,617

(22) Filed: Dec. 19, 2024

(65) Prior Publication Data

US 2025/0208533 A1 Jun. 26, 2025

(51) Int. Cl.

*G03G 15/08* (2006.01)
*G03G 15/00* (2006.01)

(52) U.S. Cl.

CPC ..... *G03G 15/0849* (2013.01); *G03G 15/0865* (2013.01); *G03G 15/0877* (2013.01); *G03G 15/0891* (2013.01); *G03G 15/50* (2013.01); *G03G 2215/0607* (2013.01)

(58) Field of Classification Search

CPC ............... G03G 15/50; G03G 15/0849; G03G 15/0865; G03G 15/0877; G03G 15/0891
USPC ............................................................ 399/30
See application file for complete search history.

(56) References Cited

U.S. PATENT DOCUMENTS 10,401,761 B2 9/2019 Sakurai et al.
10,599,070 B2 * 3/2020 Suenami ............ G03G 15/0853
10,845,729 B2 * 11/2020 Wakisaka ............... G03G 15/09
12,292,703 B2 * 5/2025 Okuyama .......... G03G 15/0853
2019/0033750 A1 1/2019 Sakurai et al.
2020/0192240 A1 6/2020 Sakurai et al.

FOREIGN PATENT DOCUMENTS

JP 2019-028221 A 2/2009
JP 2020-008777 A 1/2020
JP 2020-095197 A 6/2020

OTHER PUBLICATIONS

Tomonori Yuyama., U.S. Appl. No. 18/985,664, filed Dec. 18, 2024.

* cited by examiner

*Primary Examiner* — Hoan H Tran
(74) *Attorney, Agent, or Firm* — VENABLE LLP

(57) ABSTRACT

A driving unit rotatably drives a conveyance screw under a first rotational condition when a developing unit performs a developing operation. A controller executes first control and second control. In the first control, a developer replenishment unit replenishes developer to a developing container based on an output value of a first magnetic permeability sensor that is generated while the driving unit rotatably drives the conveyance screw. In the second control, the driving unit rotatably drives a conveyance screw under a second rotational condition, which is different from the first rotational condition, during a non-developing operation, based on the output value of the first magnetic permeability sensor that is generated while a driving unit rotatably drives the conveyance screw and an output value of a second magnetic permeability sensor that is generated while the driving unit rotatably drives the conveyance screw.

15 Claims, 14 Drawing Sheets

FIG.10

| TONER CONCENTRATION [%] EQUAL TO OR LESS THAN | THRESHOLD VALUE CHANGE COEFFICIENT |
|---|---|
| 8.0~8.2 | 1.09 |
| 8.2~8.4 | 1.07 |
| 8.4~8.6 | 1.06 |
| 8.6~8.8 | 1.04 |
| 8.8~9.0 | 1.02 |
| 9.0~9.2 | 1.00 |
| 9.2~9.4 | 0.98 |
| 9.4~9.6 | 0.96 |
| 9.6~9.8 | 0.94 |
| 9.8~10.0 | 0.93 |
| 10.0~10.2 | 0.91 |

FIG.13

| TONER CONCENTRATION [%] EQUAL TO OR LESS THAN | LOWER LIMIT THRESHOLD VALUE CHANGE COEFFICIENT | UPPER LIMIT THRESHOLD VALUE CHANGE COEFFICIENT |
|---|---|---|
| 8.0~8.2 | 1.14 | 1.09 |
| 8.2~8.4 | 1.11 | 1.07 |
| 8.4~8.6 | 1.09 | 1.06 |
| 8.6~8.8 | 1.06 | 1.04 |
| 8.8~9.0 | 1.03 | 1.02 |
| 9.0~9.2 | 1.00 | 1.00 |
| 9.2~9.4 | 0.97 | 0.98 |
| 9.4~9.6 | 0.94 | 0.96 |
| 9.6~9.8 | 0.91 | 0.94 |
| 9.8~10.0 | 0.89 | 0.93 |
| 10.0~10.2 | 0.86 | 0.91 |

IMAGE FORMING APPARATUS

BACKGROUND OF THE INVENTION

Field of the Invention

The present invention relates to an image forming apparatus.

Description of the Related Art

In image forming apparatuses using an electrophotographic system, an electrostatic latent image formed on an image bearing member is developed as a toner image using a developing unit. As such the developing unit, hitherto, one that uses two-component developer containing toner and magnetic carrier has been utilized. In the developing unit that use the two-component developer, the auto carrier refresh (ACR) method is widely adopted to suppress carrier degradation. In the ACR method, toner containing a trace amount of the carrier is replenished to the developing unit, and the excess developer resulting from such replenishment is simultaneously discharged outside of the developing unit.

In the developing unit that employs the ACR method, it is necessary to maintain the developer within the developing unit at a constant amount to maintain the quality of the developed image consistent. US2019/0033750 proposes a developing unit that indirectly predicts a developer amount within the developing unit by using a sensor that detects the height of a developer surface (bulk height) within the developing unit, and, based on that result, adjusts the developer amount within the developing unit by controlling, for example, a rotational speed of a conveyance screw.

In the developing unit of US2019/0033750, the height of a developer surface is detected by measuring the magnetic permeability of the developer within the developing unit. In an inductance sensor that measures the magnetic permeability of the developer, changes in an amount of the magnetic carrier present in the developer are detected as changes in the apparent magnetic permeability. Thereby, when the developer surface rises, the magnetic permeability increases due to an increase in the amount of the magnetic carrier in the vicinity of the sensor, and an output value of the sensor increases. Conversely, when the developer surface falls and the magnetic carrier in the vicinity of the sensor decreases, the output value of the sensor decreases.

However, it is known that, in addition to the amount of the carrier present, the magnetic permeability of the developer changes depending on a weight ratio of the toner contained in the developer (hereinafter, referred to as toner concentration). For example, when the toner concentration is low, the apparent magnetic permeability increases, and, conversely, when the toner concentration is high, the magnetic permeability decreases. As a result, the output value of the sensor that detects the developer surface changes not only by the height of the developer surface but also by being affected by the toner concentration of the developer. As a result, there is a risk of the false detection of the developer surface.

SUMMARY OF THE INVENTION

The present invention provides an image forming apparatus that can properly perform control in accordance with a developer surface.

According to a first aspect of the present invention, an image forming apparatus includes an image bearing member, a developing unit including a developer bearing member configured to bear developer that contains toner and carrier for developing an electrostatic latent image formed on the image bearing member, a developing container configured to accommodate the developer that is supplied to the developer bearing member, a conveyance screw configured to convey the developer accommodated in the developing container, a developer discharge portion configured to discharge part of the developer accommodated in the developing container, a first magnetic permeability sensor including a first detection portion configured to detect magnetic permeability of the developer accommodated in the developer container, and a second magnetic permeability sensor including a second detection portion configured to detect the magnetic permeability of the developer accommodated in the developer container, a developer replenishment unit configured to replenish the developer to the developing container, a driving unit configured to rotatably drive the conveyance screw under a first rotational condition when the developing unit performs a developing operation to develop the electrostatic latent image formed on the image bearing member, and, a controller. The second detection portion is located vertically above the first detection portion. The controller is configured to execute first control to control the developer replenishment unit to replenish the developer to the developing container based on an output value of the first magnetic permeability sensor that is generated while the driving unit rotatably drives the conveyance screw. The controller is configured to execute second control to control the driving unit such that the driving unit rotatably drives the conveyance screw under a second rotational condition, which is different from the first rotational condition, during a non-developing operation, in which the developing operation is not performed, based on the output value of the first magnetic permeability sensor that is generated while the driving unit rotatably drives the conveyance screw and an output value of the second magnetic permeability sensor that is generated while the driving unit rotatably drives the conveyance screw.

According to a second aspect of the present invention, an image forming apparatus includes an image bearing member, a developing unit including a developer bearing member configured to bear developer that contains toner and carrier for developing an electrostatic latent image formed on the image bearing member, a developing container configured to accommodate the developer that is supplied to the developer bearing member, a conveyance screw configured to convey the developer accommodated in the developing container, a developer discharge portion configured to discharge part of the developer accommodated in the developing container, a first magnetic permeability sensor including a first detection portion configured to detect magnetic permeability of the developer accommodated in the developer container, and a second magnetic permeability sensor including a second detection portion configured to detect the magnetic permeability of the developer accommodated in the developer container, a developer replenishment unit configured to replenish the developer to the developing container, a driving unit configured to rotatably drive the conveyance screw under a first rotational condition when the developing unit performs a developing operation to develop the electrostatic latent image formed on the image bearing member, and, a controller. The second detection portion is located vertically upper than the first detection portion. The controller is configured to execute first control to control the developer replenishment unit to replenish the developer to the developing container based on an output value of the first magnetic permeability sensor that is generated while the driving unit rotatably drives the conveyance screw. In a case where the output value of the first magnetic permeability sensor that is generated while the driving unit rotatably drives the conveyance screw, is a first value and an output value of the second magnetic permeability sensor that is generated while the driving unit rotatably drives the conveyance screw, is equal to or more than a first threshold value, the controller is configured to execute second control to control the driving unit such that the driving unit rotatably drives the conveyance screw under a second rotational condition, which is different from the first rotational condition, during a non-developing operation in which a developing operation is not performed. In a case where the output value of the first magnetic permeability sensor that is generated while the driving unit rotatably drives the conveyance screw, is the first value, and the output value of the second magnetic permeability sensor that is generated while the driving unit rotatably drives the conveyance screw is less than the first threshold value, the controller is configured not to execute the second control, in a case where the output value of the first magnetic permeability sensor that is generated while the driving unit rotatably drives the conveyance screw, is a second value that is larger than the first value, and the output value of the second magnetic permeability sensor that is generated while the driving unit rotatably drives the conveyance screw, is equal to or more than a second threshold value that is larger than the first threshold value, the controller is configured to execute the second control. In a case where the output value of the first magnetic permeability sensor that is generated while the driving unit rotatably drives the conveyance screw is the second value, and the output value of the second magnetic permeability sensor that is generated while the driving unit rotatably drives the conveyance screw is less than the second threshold value, the controller is configured not to execute the second control.

According to a third aspect of the present invention, an image forming apparatus includes an image bearing member, a developing unit including a developer bearing member configured to bear developer that contains toner and a carrier for developing an electrostatic latent image formed on the image bearing member, a developing container configured to accommodate the developer that is supplied to the developer bearing member, a conveyance screw configured to convey the developer accommodated in the developing container, a developer discharge portion configured to discharge part of the developer accommodated in the developing container, a first magnetic permeability sensor including a first detection portion configured to detect magnetic permeability of the developer accommodated in the developer container, and a second magnetic permeability sensor including a second detection portion configured to detect the magnetic permeability of the developer accommodated in the developer container, a developer replenishment unit configured to replenish the developer to the developing container, a driving unit configured to rotatably drive the conveyance screw, and, a controller. The second detection portion is located vertically above the first detection portion. The controller is configured to control the developer replenishment unit to replenish the developer to the developing container based on an output value of the first magnetic permeability sensor that is generated while the driving unit rotatably drives the conveyance screw. In a case where the output value of the first magnetic permeability sensor that is generated while the driving unit rotatably drives the conveyance screw, is a first value, and an output value of the second magnetic permeability sensor that is generated while the driving unit rotatably drives the conveyance screw, is equal to or less than a first threshold value, the controller is configured to control the driving unit such that the driving unit rotatably drives the conveyance screw at a second rotational speed that is slower than the first rotational speed during a developing operation in which the developing unit develops the electrostatic latent image formed on the image bearing member. In a case where the output value of the first magnetic permeability sensor that is generated while the driving unit rotatably drives the conveyance screw, is the first value, and the output value of the second magnetic permeability sensor that is generated while the driving unit rotatably drives the conveyance screw, is larger than the first threshold value, the controller is configured to control the driving unit such that the driving unit rotatably drives the conveyance screw at the first rotational speed during the developing operation. In a case where the output value of the first magnetic permeability sensor that is generated while the driving unit rotatably drives the conveyance screw, is a second value that is larger than the first value, and the output value of the second magnetic permeability sensor that is generated while the driving unit rotatably drives the conveyance screw, is equal to or less than a second threshold value that is larger than the first threshold value, the controller is configured to control the driving unit such that the driving unit rotatably drives the conveyance screw at the second rotational speed during the developing operation. In a case where the output value of the first magnetic permeability sensor that is generated while the driving unit rotatably drives the conveyance screw, is the second value, and the output value of the second magnetic permeability sensor that is generated while the driving unit rotatably drives the conveyance screw, is larger than the second threshold value, the controller is configured to control the driving unit such that the driving unit rotatably drives the conveyance screw at the first rotational speed.

Further features of the present invention will become apparent from the following description of exemplary embodiments with reference to the attached drawings.

BRIEF DESCRIPTION OF THE DRAWINGS

FIG. 10 is a table illustrating a threshold value change coefficient for toner concentration segments in the developing unit according to the first embodiment.

FIG. 13 is a table illustrating a lower limit threshold value change coefficient for the toner concentration segments in the developing unit according to the second embodiment.

DESCRIPTION OF THE EMBODIMENTS

First Embodiment

A first embodiment will be described with reference to FIGS. 1 to 11B. First, a schematic configuration of an image forming apparatus of the present embodiment will be described with reference to FIG. 1.

Image Forming Apparatus

Figure 1:
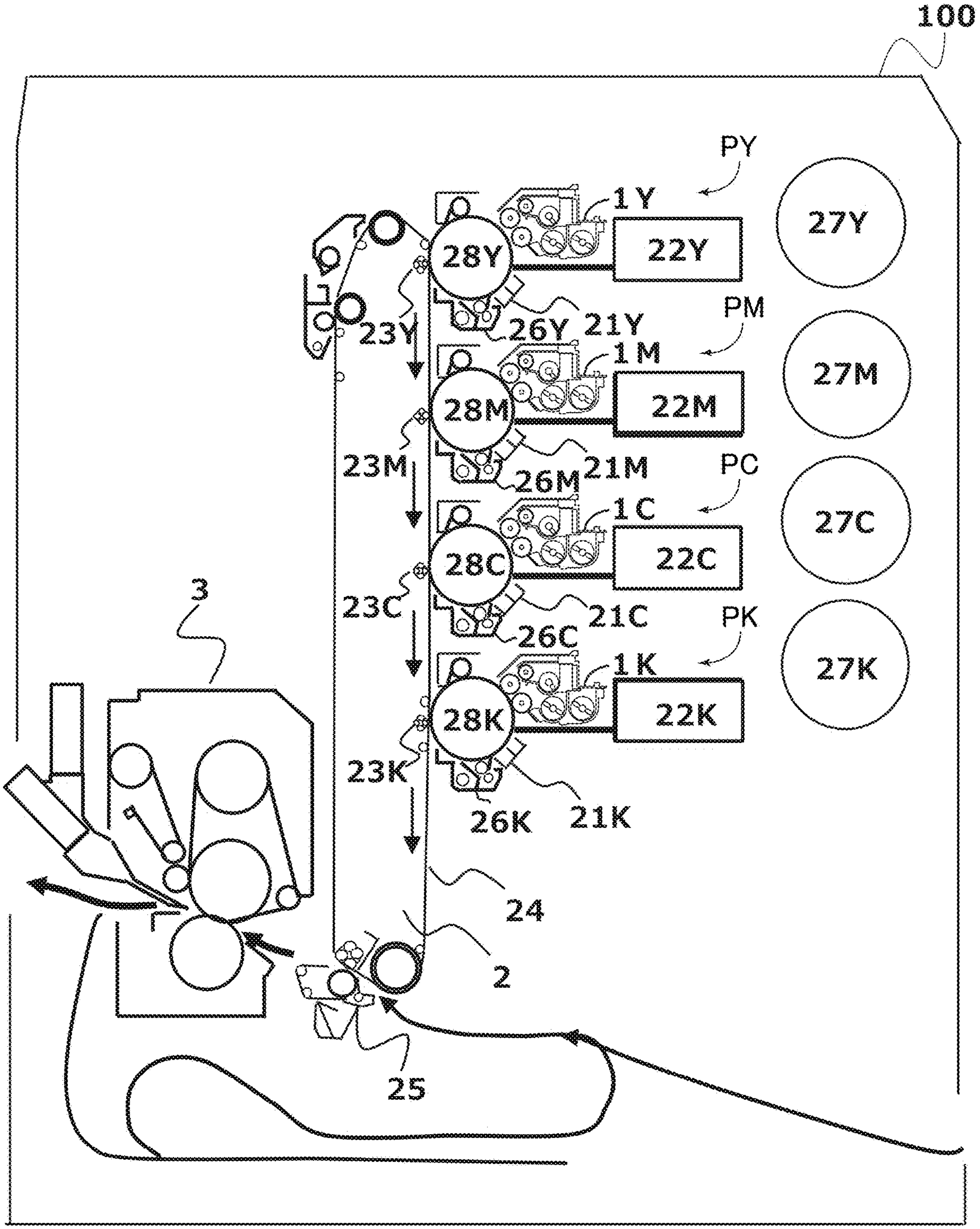
FIG. 1 is a cross-sectional view illustrating a schematic configuration of an image forming apparatus according to a first embodiment.

The image forming apparatus 100 is a full color image forming apparatus, and, in the present embodiment, is a multi-function peripheral (MFP) incorporating, for example, a copying function, a printing function, and a scanning function. In the image forming apparatus 100, as illustrated in FIG. 1, image forming units PY, PM, PC, and PK, each performing the formation of toner images in four colors of yellow, magenta, cyan, and black, are arranged in parallel.

The image forming units PY, PM, PC, and PK of each color include a primary charge units 21Y, 21M, 21C, and 21K, developing units 1Y, 1M, 1C, and 1K, optical writing units (exposing units) 22Y, 22M, 22C, and 22K, photosensitive drums 28Y, 28M, 28C, and 28K, and cleaning units 26Y, 26M, 26C, and 26K. In addition, the image forming apparatus 100 includes a transfer unit 2 and a fixing unit 3. To be noted, since configurations of the image forming units PY, PM, PC, and PK of each color are similar, the following description will proceed using the image forming unit PY as a representative.

The photosensitive drum 28Y, serving as a rotatable image bearing member, is a photoreceptor with a photosensitive layer made from a resin such as polycarbonate containing an organic photoconductor (OPC), and is configured to rotate at a predetermined speed. The primary charge unit 21Y includes a corona discharge electrode arranged around the photosensitive drum 28Y, and charges a surface of the photosensitive drum 28Y using generated ions.

A scanning optical device is incorporated in the optical writing unit 22Y, and, by exposing the charged photosensitive drum 28Y based on image data, the optical writing unit 22Y reduces the electric potential of an exposed area, so that a charge pattern (electrostatic latent image) corresponding to the image data is formed on the photosensitive drum 28Y. By transferring accommodated developer to the photosensitive drum 28Y, the developing unit 1Y develops the electrostatic latent image formed on the photosensitive drum 28Y. The developer is formed by mixing carrier with toner corresponding to each color. The electrostatic latent image is visualized by the toner.

The transfer unit 2 includes primary transfer rollers 23Y, 23M, 23C, and 23K, an intermediate transfer belt 24, and a secondary transfer roller 25. The intermediate transfer belt 24 is wound around by the primary transfer rollers 23Y, 23M, 23C, and 23K and a plurality of rollers, and is supported in a travelable manner. From top to bottom in FIG. 1, each of the primary transfer rollers 23Y, 23M, 23C, and 23K corresponds to each of colors of yellow (Y), magenta (M), cyan (C), and black (K). The secondary transfer roller 25 is arranged outside of the intermediate transfer belt 24, and is configured such that a recording material can pass through a gap with the intermediate transfer belt 24. To be noted, the recording material includes a sheet such as paper and a plastic sheet.

The toner images of each color formed on the photosensitive drums 28Y, 28M, 28C, and 28K are transferred onto the intermediate transfer belt 24 by the primary transfer rollers 23Y, 23M, 23C, and 23K in sequence, and the toner image with color is formed by superimposing each layer of yellow, magenta, cyan, and black colors. The formed toner image is transferred onto the recording material, which is conveyed from a cassette or the like storing the recording material, by the secondary transfer roller 25. In the fixing unit 3, heat and pressure are applied to the recording material onto which the toner image has been transferred. Thereby, the toner on the recording material is melted, and the color image is fixed on the recording material.

Developer storage units 27Y, 27M, 27C, and 27K are disposed corresponding to each of the developing units 1Y, 1M, 1C, and 1K, and bottles of the developer storage units 27Y, 27M, 27C, and 27K storing the developers respectively corresponding to colors of yellow, magenta, cyan, and black are loaded in a replaceable manner. The developer storage units 27Y, 27M, 27C, and 27K are configured to convey (replenish) the developer to the developing units 1Y, 1M, 1C, and 1K corresponding to the color of the developer which is stored.

For example, a toner weight ratio, that is, toner concentration, in the developer accommodated in the bottles is 85 to 95%, and a toner weight ratio in the developing units 1Y, 1M, 1C, and 1K is 5 to 10%. The toner concentration is a ratio of the toner weight with respect to the total weight of the carrier and the toner. Therefore, when the toner is consumed during development in the developing units 1Y, 1M, 1C, and 1K, the developer containing the toner is replenished corresponding to its consumed amount, and the toner weight ratio in the developer within the developing units 1Y, 1M, 1C, and 1K is maintained constant.

Control Configuration

Figure 2:
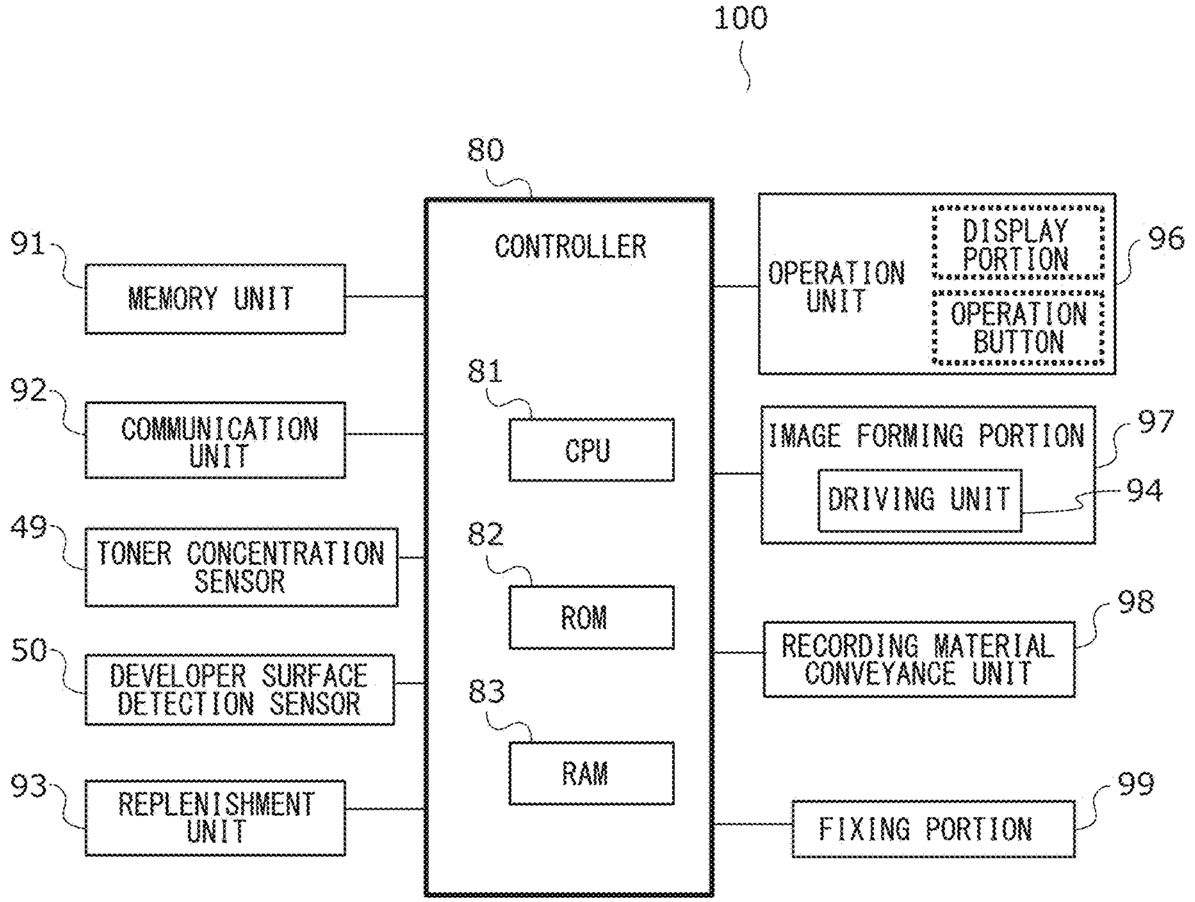
FIG. 2 is a control block diagram of the image forming apparatus according to the first embodiment.

FIG. 2 is a block diagram illustrating a main part of a control system of the image forming apparatus 100. The image forming apparatus 100 includes an operation unit 96, an image forming portion 97, a recording material conveyance unit 98, a fixing portion 99, and a controller 80. The operation unit 96 includes a display portion capable of displaying various information, an operation button, and the like. The display portion may also be a touch panel that allows a touch operation. The image forming portion 97 includes various motors that drive configurations such as the image forming portions PY, PM, PC, and PK, the photosensitive drums 28Y, 28M, 28C, and 28K, and the developing units 1Y, 1M, 1C, and 1K to form the image on the recording material as described above, as well as power sources that apply voltage to these configurations. The image forming portion 97 includes a driving unit 94 such as a motor that rotatably drives a developer supply screw 42 and a developer agitation screw 43, described below. The recording material conveyance unit 98 includes various motors that drive conveyance rollers conveying the recording material. The fixing portion 99 includes a heater of the fixing unit 3 and a motor that drives the fixing unit 3. These operation unit 96, image forming portion 97, recording material conveyance unit 98, and fixing portion 99 are connected to the controller 80, and are controlled by the controller 80.

The controller 80 includes a central processing unit (CPU) 81, a read only memory (ROM) 82, a random access memory (RAM) 83, and the like. The CPU 81 reads programs corresponding to processing requirements from the ROM 82, loads them into the RAM 83, and controls operations of each configuration of the image forming apparatus 100 by coordinating with the loaded programs. At this time, various data stored in a memory unit 91 is referenced.

The memory unit 91 is configured with, for example, a non-volatile semiconductor memory (so-called flash memory) or a hard disk drive. Through a communication unit 92, the controller 80 performs the transmission and reception of the various data with an external apparatus (e.g., a personal computer) connected to a communication network such as a local area network (LAN) and a wide area network (WAN). The controller 80, for example, receives image data (input image data) transmitted from the external apparatus, and forms the image on the recording material based on the image data. The communication unit 92 is configured with a communication control card such as a LAN card.

In addition, a toner concentration sensor 49, a developer surface detection sensor 50, and a replenishment unit 93 are connected to the controller 80. The toner concentration sensor 49 is disposed in each of the developing units 1Y, 1M, 1C, and 1K, and, as described below, detects the toner concentration of the developer within the developing units 1Y, 1M, 1C, and 1K. Also, the developer surface detection sensor 50 is disposed in each of the developing units 1Y, 1M, 1C, and 1K, and, as described below, detects respectively a developer surface within the developing units 1Y, 1M, 1C, and 1K. The replenishment unit 93, serving as a developer replenishment unit, includes a motor that drives a replenishment mechanism supplying the developer from each of the developer storage units 27Y, 27M, 27C, and 27K to the respective developing units 1Y, 1M, 1C, and 1K. The controller 80 controls the replenishment unit 93 and the like based on detection results of the toner concentration sensor 49 and the developer surface detection sensor 50.

Developing Unit

Figure 3:
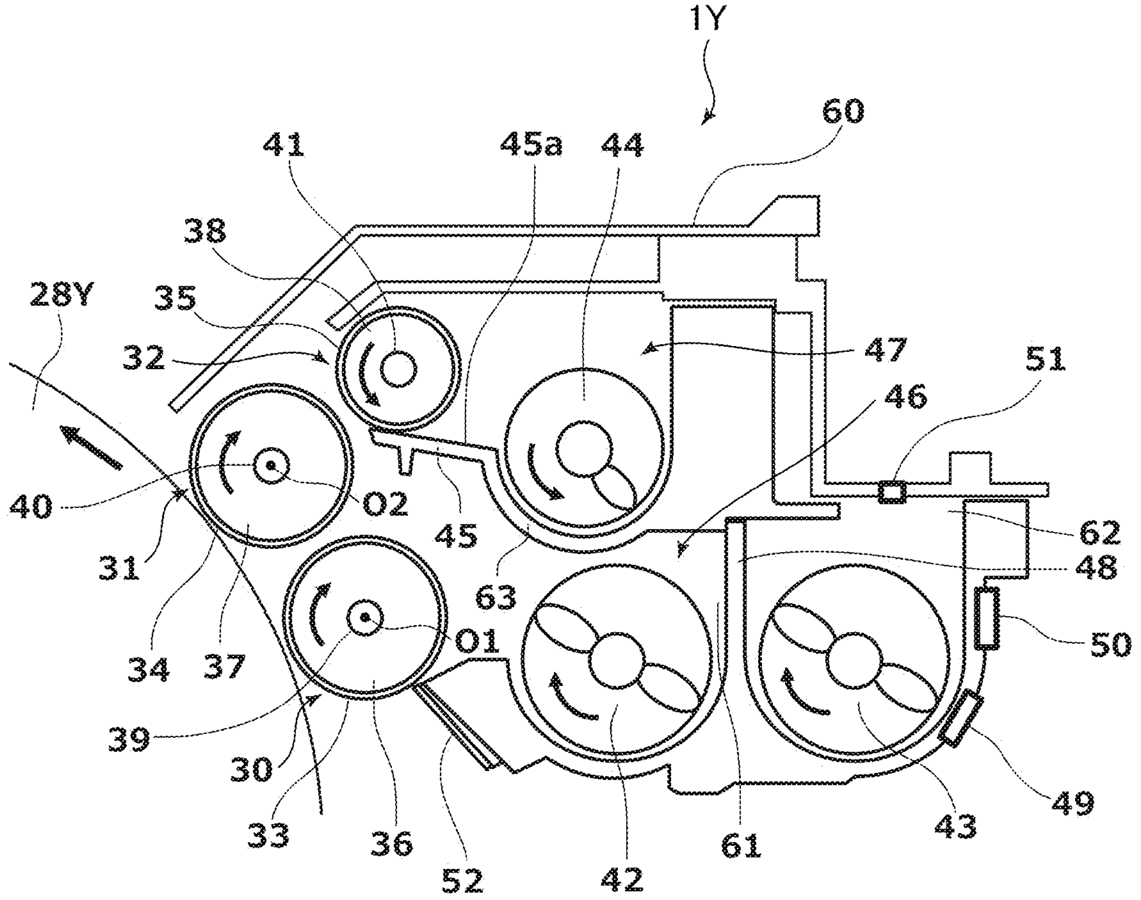
FIG. 3 is a cross-sectional view illustrating a schematic configuration of a developing unit according to the first embodiment.
Figure 4:
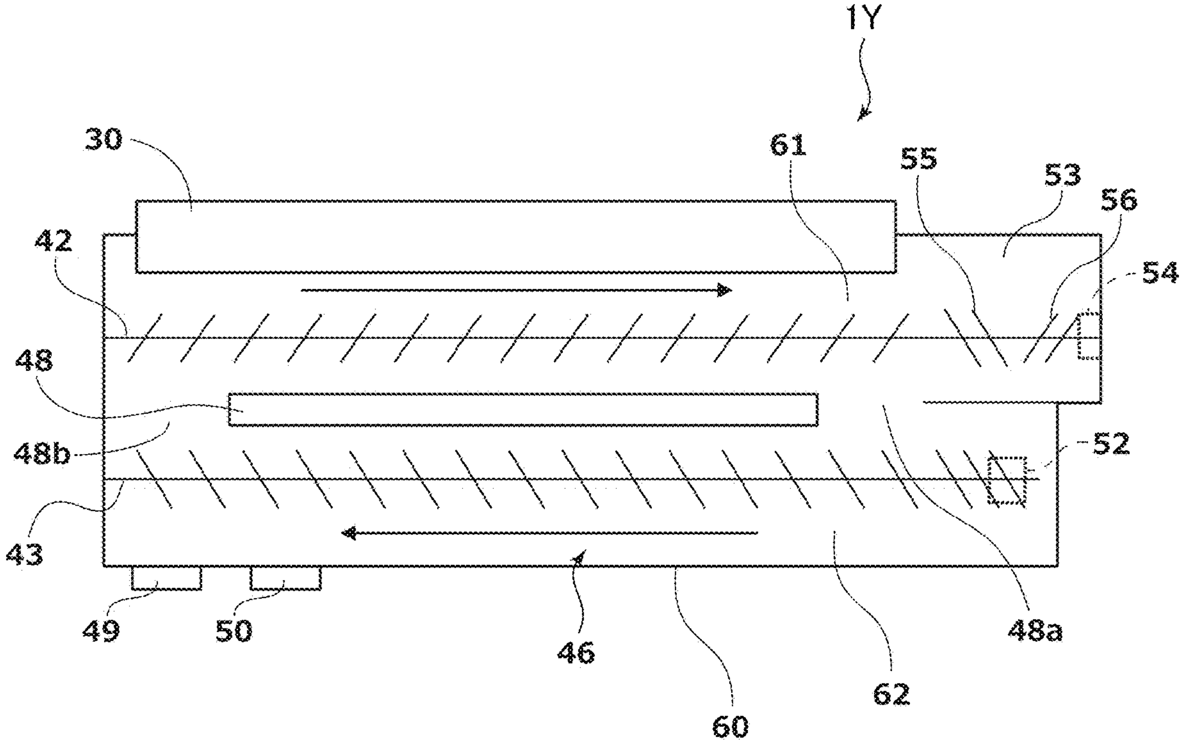
FIG. 4 is a schematic diagram illustrating the developing unit according to the first embodiment, when cut along a direction parallel to a rotational axis of a first developing roller.

Next the developing units 1Y, 1M, 1C, and 1K will be described in detail with reference to FIGS. 3 and 4. To be noted, since configurations of the developing units 1Y, 1M, 1C, and 1K are the same, hereinafter, as a representative, the developing unit 1Y will be described. FIG. 3 is a schematic diagram illustrating the developing unit 1Y illustrated in FIG. 1, and FIG. 4 is a schematic diagram illustrating the developing unit 1Y when cut along a direction parallel to a rotational axis of a first developing roller 30 and viewed from above.

As illustrated in FIG. 3, the developing unit 1Y includes the first developing roller 30, a second developing roller 31, a peeling roller 32, the developer supply screw 42, the developer agitation screw 43, and a developer collection screw 44, and these members are accommodated in a developing container 60.

The first developing roller 30 is a developer bearing member that is rotatably driven, and is arranged at a position adjacent to the photosensitive drum 28Y such that its rotational axis is substantially parallel to a rotational axis of the photosensitive drum 28Y. The first developing roller 30 includes a rotating first sleeve 33 and a non-rotating first magnet (fixed magnet) 36, which is arranged within the first sleeve 33 and utilizes a magnetic force to attract the developer onto a surface of the first sleeve 33. Then, the first developing roller 30 attracts (bears) the developer drawn from the developer supply screw 42 based on the magnetic force, and develops the electrostatic latent image formed on the rotating photosensitive drum 28Y (on the image bearing member) using the developer.

The first sleeve 33 is a non-magnetic cylindrical member, and is rotatably driven about a rotation shaft 39. A rotational direction of the first sleeve 33 is a clockwise direction as illustrated by an arrow in FIG. 3, and, in the present embodiment, is opposite to a rotational direction of the photosensitive drum 28Y. Therefore, the first sleeve 33 and the photosensitive drum 28Y rotate in the same direction at positions facing each other. That is, the photosensitive drum 28Y performs a forward development operation in which the photosensitive drum 28Y rotates from vertically below toward vertically above at the position facing the first sleeve 33. Between an inner circumferential surface of the first sleeve 33 and an outer circumferential surface of the first magnet 36, a space that allows the rotation of the first sleeve 33 is arranged.

The developer attracted onto the first sleeve 33 is conveyed toward the photosensitive drum 28Y by a rotational operation of the first sleeve 33, and develops the electrostatic latent image formed on the photosensitive drum 28Y. After the development of the electrostatic latent image formed on the photosensitive drum 28Y, the developer remaining on the first sleeve 33 is conveyed to a position adjacent to the second developing roller 31. Then, at a position adjacent to the closest position between the first and second developing rollers 30 and 31, through a magnetic field generated by the first magnet 36 arranged in the first developing roller 30 and a magnetic field generated by a second magnet 37 arranged in the second developing roller 31, the developer is peeled from the first sleeve 33, and is transferred onto the second sleeve 34.

The second developing roller 31 of the developing unit 1Y of the present embodiment is arranged above the first developing roller 30 in the vertical direction, as described next. Therefore, the transfer of the developer from the first sleeve 33 to a second sleeve 34 also needs to occur from vertically below to vertically above, against gravity. To be noted, the first and second sleeves 33 and 34 are arranged with a predetermined gap at the closest position.

The second developing roller 31 is the developer bearing member that is rotatably driven. The second developing roller 31 is arranged downstream of the first developing roller 30 in the rotational direction of the photosensitive drum 28Y such that a rotation center O2 of the second developing roller 31 is arranged to be above a rotation center O1 of the first developing roller 30 in the vertical direction. The second developing roller 31 is transferred the developer from the first developing roller 30 through the magnetic force. In the present embodiment, the entire second developing roller 31 is positioned above the rotation center O1 of the first developing roller 30. Similar to the first developing roller 30, the second developing roller 31 is arranged at a position adjacent to the photosensitive drum 28Y such that its rotational axis is substantially parallel to the rotational axis of the photosensitive drum 28Y. Therefore, the rotational axes of the second and first developing rollers 31 and 30 are substantially parallel to each other.

The second developing roller 31 as described above includes the rotating second sleeve 34 and the second magnet (fixed magnet) 37 that is arranged in the non-rotating manner within the second sleeve 34 and utilizes the magnetic force to attract the developer onto a surface of the second sleeve 34. Then, based on the magnetic force, the developer is transferred from the first developing roller 30 (the first sleeve 33) to the second developing roller 31, and is attracted (borne) onto the second developing roller 31. The second developing roller 31 develops the electrostatic latent image formed on the rotating photosensitive drum 28Y using the developer. To be noted, the peeling roller 32, described below, is positioned to the side of the second developing roller 31.

The second sleeve 34 is the non-magnetic cylindrical member, and is rotatably driven about a rotation shaft 40. A rotational direction of the second sleeve 34 is the same clockwise direction as the first sleeve 33 as illustrated by an arrow in FIG. 3, and, in the present embodiment, is opposite to the rotational direction of the photosensitive drum 28Y. Therefore, the second sleeve 34 and the photosensitive drum 28Y are rotating in the same direction at positions facing each other. That is, the photosensitive drum 28Y performs the forward development operation in which the photosensitive drum 28Y rotates from vertically below toward vertically above at the position facing the second sleeve 34. In addition, the second and first sleeves 34 and 33 rotate in opposite directions at positions facing each other. Between an inner circumferential surface of the second sleeve 34 and an outer circumferential surface of the second magnet 37, a space that allows the rotation of the second sleeve 34 is arranged.

The developer attracted onto the second sleeve 34 is conveyed toward the photosensitive drum 28Y by a rotational operation of the second sleeve 34, and develops the electrostatic latent image formed on the photosensitive drum 28Y. After the development of the electrostatic latent image formed on the photosensitive drum 28Y, the developer remained on the second sleeve 34 is conveyed to a position adjacent to the peeling roller 32 by the rotational operation of the second sleeve 34. Then, at a position adjacent to the closest position between the second developing roller 31 and the peeling roller 32, the developer is transferred from the second sleeve 34 onto the peeling roller 32 through the magnetic field generated by the second magnet 37 arranged in the second developing roller 31 and a magnetic field generated by a third magnet 38 arranged in the peeling roller 32.

The peeling roller 32, serving as a peeling unit, is arranged opposite to the photosensitive drum 28Y with respect to the rotation center of the second sleeve 34, and peels the developer, which remains on the second developing roller 31 after the electrostatic latent image on the photosensitive drum 28Y is developed by the second developing roller 31, from the second developing roller 31. In particular, the peeling roller 32 is the developer bearing member that is rotatably driven, and is arranged between the second developing roller 31 and the developer collection screw 44. A rotation center of the peeling roller 32 is arranged to be above the rotation center O2 of the second developing roller 31.

The peeling roller 32 is arranged such that a rotational axis of the peeling roller is substantially parallel to the rotational axis of the second developing roller 31. The peeling roller 32 as described above includes the rotating third sleeve 35 and the third magnet (fixed magnet) 37, which is arranged in a non-rotating manner within the third sleeve 35 and utilizes the magnetic force to attract the developer onto a surface of the third sleeve 35, and transfers the developer from the second developing roller 31 based on the magnetic force.

The third sleeve 35 is the non-magnetic cylindrical member, and is rotatably driven about a rotation shaft 41. A rotational direction of the third sleeve 35 is a counter-clockwise direction as illustrated by an arrow in FIG. 3, and, in the present embodiment, is opposite to the rotational direction of the second sleeve 34. Therefore, the third and second sleeves 35 and 34 are rotating in the same direction at positions facing each other. Between an inner circumferential surface of the third sleeve 35 and an outer circumferential surface of the third magnet 38, a space that allows the rotation of the third sleeve 35 is arranged.

The developer attracted onto the third sleeve 35 is conveyed downstream in the rotational direction by a rotational operation of the third sleeve 35, and is peeled off from the third sleeve 35 at a position adjacent to the developer collection screw 44 by the third magnet 38 arranged in the peeling roller 32, and falls by its own weight toward a guide member 45 positioned vertically below. Then, the developer that has fallen to the guide member 45 is guided by its own weight toward the developer collection screw 44.

The guide member 45 and the developer collection screw 44 constitute a developer collection portion 47, serving as a collection unit that collects the developer peeled off from the third sleeve 35 on the peeling roller 32. In the developer collection portion 47, a rotation center of the developer collection screw 44 is arranged to be positioned below the rotation center of the peeling roller 32 in the vertical direction, and the developer collection screw 44 conveys the developer transferred (collected) from the peeling roller 32 while agitating.

The guide member 45, serving as a guide unit, is arranged vertically below the peeling roller 32, and guides the developer, which has been peeled off by the peeling roller 32, toward the developer collection screw 44. For more securely guiding the developer toward the developer collection screw 44, such a guide member 45 includes an inclined surface 45*a* on which the developer slides down by its own weight. The inclined surface 45*a* is inclined with respect to a horizontal direction such that a portion on a side of the developer collection screw 44 is lower than a portion below the peeling roller 32.

The developer collection screw 44, serving as a collection member and a conveyance unit, conveys the collected developer to a developer circulation portion 46, described next. That is, the developer collection screw 44 is a screw conveyance member that is used to convey the developer, which has been collected by sliding down the inclined surface of the guide member 45, in one direction while agitating.

The developer circulation portion 46 is a supply portion for supplying the developer to the first developing roller 30, and includes the developer supply screw 42, serving as a first conveyance screw, and the developer agitation screw 43, serving as a second conveyance screw. The developer supply screw 42 and the developer agitation screw 43 are rotatably driven by the driving unit 94. In the developer circulation portion 46, the developer is supplied to the first developing roller 30 while being conveyed substantially in the horizontal direction and agitated by the developer supply screw 42 and the developer agitation screw 43. In addition, as described above, the developer that has been collected by the developer collection portion 47 falls by its own weight, and is introduced into the developer circulation portion 46.

The developer supply screw 42, the developer agitation screw 43, and the developer collection screw 44 are the screw conveyance members that convey the developer to one direction while agitating, and the developer supply screw 42 and the developer agitation screw 43 are positioned vertically below the developer collection screw 44. In addition, the rotational axes of these developer supply screw 42, developer agitation screw 43, and developer collection screw 44 are arranged to be substantially parallel to each other. The rotational axes of these screws are also substantially parallel to the rotational axis of the first developing roller 30.

The developer supply screw 42 is positioned between the first developing roller 30 and the developer agitation screw 43, and a partition wall 48 of the developing container 60 is arranged between the developer supply screw 42 and the developer agitation screw 43. The partition wall 48 of the developing container 60 is arranged to extend along the rotational axis directions of the developer supply screw 42 and the developer agitation screw 43. Communication ports 48*a* and 48*b* (FIG. 4) communicating between a first conveyance path 61, serving as a first chamber where the developer is conveyed by the developer supply screw 42, and a second conveyance path 62, serving as a second chamber where the developer is conveyed by the developer agitation screw 43 are provided in the partition wall 48. Then, a circulation path of the developer is formed between the first and second conveyance paths 61 and 62.

The developer agitated by the developer collection screw 44 falls by its own weight toward the developer supply screw 42 via a communication port, not shown, formed in a partition wall 63 of the developing container 60. The partition wall 63 is located between the developer collection screw 44 and the developer supply screw 42. That is, the developer that has been agitated by the developer collection screw 44 is introduced into the developer supply screw 42. To be noted, the guide member 45 described above is formed integrally with the partition wall 63, and the developer collection screw 44 is arranged above the partition wall 63.

A position of the communication port through which the developer agitated by the developer collection screw 44 falls by its own weight and is introduced into the developer circulation portion 46 is preferably arranged to avoid an area (intermediate part in the rotational axis direction of the developer supply screw 42) in which the developer is being supplied toward the first developing roller 30. In the present embodiment, the position of the communication port is set to be within a range in which a downstream end portion (ending end portion) of the first conveyance path 61 is included in the developer conveyance direction of the first conveyance path 61 in which the developer supply screw 42 is arranged.

As illustrated by arrows in FIG. 4, a developer conveyance direction in which the developer supply screw 42 conveys the developer and a developer conveyance direction in which the developer agitation screw 43 conveys the developer are directions opposite to each other. Then, a starting end side (upstream end side in the developer conveyance direction) of the first conveyance path 61, in which the developer supply screw 42 is arranged, and an ending end side (downstream end side in the developer conveyance direction) of the second conveyance path 62, in which the developer agitation screw 43 is arranged, communicate via the communication port 48*b* disposed in the partition wall 48. An ending end side (downstream end side in the developer conveyance direction) of the first conveyance path 61 and a starting end side (upstream end side in the developer conveyance direction) of the second conveyance path 62 communicate via the communication port 48*a* disposed in the partition wall 48. Therefore, the developer circulates in the rotational directions of the developer supply screw 42 and the developer agitation screw 43, as illustrated by the arrows in FIG. 3, and substantially in the horizontal direction within the developing container 60, and part of the developer is supplied toward the first developing roller 30.

A developer supply port 51 is arranged above the developer agitation screw 43 in the developing container 60, and is connected to the developer storage unit 27Y (refer to FIG. 1). Then, the developer supply port 51 is configured to supply the developer stored in the bottle, which is loaded into the developer storage unit 27Y, to the second conveyance path 62, in which the developer agitation screw 43 is arranged.

Since, as described above, the toner concentration (toner weight ratio) of the developer stored in the bottle of the developer storage unit 27Y is larger than the toner concentration of the developer in the developing unit 1Y, by adjusting the developer that is replenished to the second conveyance path 62, the toner weight ratio of the developer in the developing unit 1Y can be maintained constant.

As illustrated in FIG. 4, a developer discharge portion 53 is arranged at a most downstream position of the developer supply screw 42 in the developer conveyance direction, and discharges excess developer within the developing unit 1Y from a developer discharge port 54 to the outside of the developing unit 1Y. A screw 55 whose developer conveyance direction is opposite to the developer conveyance direction of the developer supply screw 42 is formed in the developer discharge portion 53. The screw 55 is coaxially disposed with the developer supply screw 42, and rotates in conjunction with the developer supply screw 42 to generate a flow that pushes the developer back from the developer discharge portion 53 toward the developer circulation portion 46.

In addition, downstream of the screw 55 in the developer conveyance direction of the developer supply screw 42, a screw 56 that conveys the developer in the same direction as the developer conveyance direction of the developer supply screw 42 is disposed coaxially with the developer supply screw 42 and the screw 55. The screw 56 rotates in conjunction with the developer supply screw 42 and the screw 55, conveys the developer, which has passed over the screw 55, to the developer discharge port 54, and discharges the developer from the developer discharge port 54.

Thereby, in a state in which a developer amount within the developing unit 1Y is properly maintained, a developer amount discharged from the developer discharge port 54 is suppressed by pushing the developer back using the screw 55. On the other hand, when the toner is replenished from the developer supply port 51 into the developing unit 1Y and the developer amount trying to move from the developer supply screw 42 to the developer discharge portion 53 increases, the developer moves to the screw 56 by passing over the screw 55, and the excess developer is discharged from the developer discharge port 54 to the outside of the developing unit 1Y. At this time, when rotational speeds of the developer supply screw 42 and the developer agitation screw 43 are increased, since a movement of the developer toward the developer discharge portion 53 is enhanced, the developer amount discharged from the developer discharge port 54 can be increased. On the other hand, when the rotational speeds of the developer supply screw 42 and the developer agitation screw 43 are decreased, since the movement of the developer toward the developer discharge portion 53 is suppressed, the developer amount discharged from the developer discharge port 54 can be decreased.

The toner concentration sensor 49, serving as a first inductance sensor (first magnetic permeability sensor) is arranged to detect the toner concentration within the developer contained in the developer circulation portion 46. The toner concentration sensor 49 is an inductance sensor that detects the magnetic permeability of the developer. Since the toner concentration responds to an amount of toner consumption in the developing unit 1Y, the toner concentration is used for the control of developer replenishment from the developer storage unit 27Y. When the controller 80 (FIG. 2), for example, detects that the toner concentration has decreased below a predetermined toner concentration, the developer is replenished from the developer storage unit 27Y (a replenishment operation is performed). That is, the controller 80 performs the replenishment operation as first control to control the replenishment unit 93 to replenish the developer to the developing container 60 based on an output value of the toner concentration sensor 49 that is generated while the driving unit 94 rotatably drives the developer supply screw 42 and the developer agitation screw 43.

To be noted, since the magnetic permeability of the developer changes depending on the toner concentration, it is possible to detect the toner concentration by using the magnetic permeability that is the output value of the toner concentration sensor 49. Since the toner concentration sensor 49 detects the magnetic permeability of the developer, the output value increases as the toner concentration decreases. That is, the toner concentration sensor 49 is configured such that a toner concentration in a case where the output value is at a second value, which is larger than a first value, decreases compared to a toner concentration in a case where the output value is at the first value. The toner concentration sensor 49 is arranged in the second conveyance path 62. In particular, the toner concentration sensor 49 is disposed, as illustrated in FIG. 3, vertically below the rotational axis of the developer agitation screw 43 and, as illustrated in FIG. 4, at a downstream end portion of the second conveyance path 62 in the developer conveyance direction of the developer agitation screw 43.

The developer surface detection sensor 50, serving as a second inductance sensor (second magnetic permeability sensor), is arranged to detect the developer surface contained in the developer circulation portion 46. The developer surface detection sensor 50 is an inductance sensor that detects the magnetic permeability of the developer. The controller 80 performs developer discharge control for maintaining the developer amount within the developing unit 1Y constant based on the developer surface detected by the developer surface detection sensor 50 and the toner concentration detected by the toner concentration sensor 49. The developer surface detection sensor 50 is arranged in the second conveyance path 62. In particular, the developer surface detection sensor 50 is disposed, as illustrated in FIG. 3, vertically above the rotational axis of the developer agitation screw 43 and, as illustrated in FIG. 4, upstream of the toner concentration sensor 49 in the developer conveyance direction of the developer agitation screw 43.

A detection surface (second detection portion) of the developer surface detection sensor 50 is positioned vertically above a detection surface (first detection portion) of the toner concentration sensor 49. The detection surface of the developer surface detection sensor 50 and the detection surface of the toner concentration sensor 49 are desirably arranged within a range of a distance corresponding to four pitches of a blade of the developer agitation screw 43 in the rotational axis direction of the developer agitation screw 43. With this configuration, a detection area of the toner concentration of the developer and a detection area of the developer surface can be regarded as substantially the same. In the present embodiment, one pitch of the blade of the developer agitation screw 43 is set to 30 millimeters (mm), and the detection surface of the developer surface detection sensor 50 is positioned 20 mm above the detection surface of the toner concentration sensor 49 in the vertical direction. In addition, in the rotational axis direction of the developer agitation screw 43, the detection surface of the developer surface detection sensor 50 is arranged at a position 50 mm upstream in the developer conveyance direction of the developer agitation screw 43 from the detection surface of the toner concentration sensor 49.

A regulation member 52 is arranged adjacent to the first developing roller 30, and is used to regulate the developer amount supplied from the developer circulation portion 46 to the first developing roller 30. The regulation member 52 can be, for example, configured to regulate the developer amount attracted onto the first developing roller 30 based on a gap between the surface of the first sleeve 33 of the first developing roller 30 and an end portion of the regulation member 52.

In a circulation path of the developer within the developing container 60, after the developer is conveyed substantially in the horizontal direction within the developer circulation portion 46 while being agitated, the developer is supplied to the first developing roller 30 and is transferred from the first developing roller 30 to the second developing roller 31 arranged above the first developing roller 30 based on the magnetic force. Next, after the developer is transferred from the second developing roller 31 to the peeling roller 32, arranged to the side of the second developing roller 31, based on the magnetic force, the developer is peeled off the peeling roller 32 by the third magnet 38 arranged in the peeling roller 32. Then, the developer is collected by the developer collection portion 47, and is introduced into the developer circulation portion 46 again.

Developer

As described above, in the present embodiment, the two-component development method is used as a development method, and the developer that is used is a mixture of negatively charged non-magnetic toner and a carrier with magnetic properties. The non-magnetic toner includes a resin, such as polyester and styrene-acrylic, that encapsulates a colorant and a wax component, and, after being processed into a powder form through pulverization or polymerization, fine powders of titanium dioxide, silica, and the like are added to the surface. The magnetic carrier is resin coated on a surface of a core made from resin particles kneaded with ferrite particles or magnetic powder. In the present embodiment, the toner concentration in the developer (weight ratio of the toner contained in the developer) in an initial state is 9%.

Since, generally, the two-component development method, using the toner and carrier, charges both components to a predetermined polarity by bringing the toner and carrier into frictional contact, the two-component development method has a feature of imposing less stress on the toner compared to a single-component development method that uses a single-component developer. On the other hand, extended usage results in an increase in contaminants on a carrier surface (spent), and, therefore, reduces the ability to charge the toner over time. As a result, issues such as ghosting and toner scattering occur. To extend the service life of the two-component developing unit, increasing the carrier amount accommodated in the developing unit can be considered, but this will lead to an increase in the size of the developing unit, which is undesirable.

To eliminate the aforementioned issues related to the two-component developer, the present embodiment employs the auto carrier refresh (ACR) method. The ACR method involves gradually supplying fresh developer from the developer storage unit 27Y into the developing unit 1Y, while simultaneously discharging the developer with deteriorated charging performance through the developer discharge port 54 of the developing unit 1Y, and, thereby, suppresses an increase in the degraded carrier. With this configuration, the degraded carrier within the developing unit 1Y is gradually replaced with a fresh carrier, and the charging performance of the carrier in the developing unit 1Y can be maintained substantially constant.

Figure 5A:
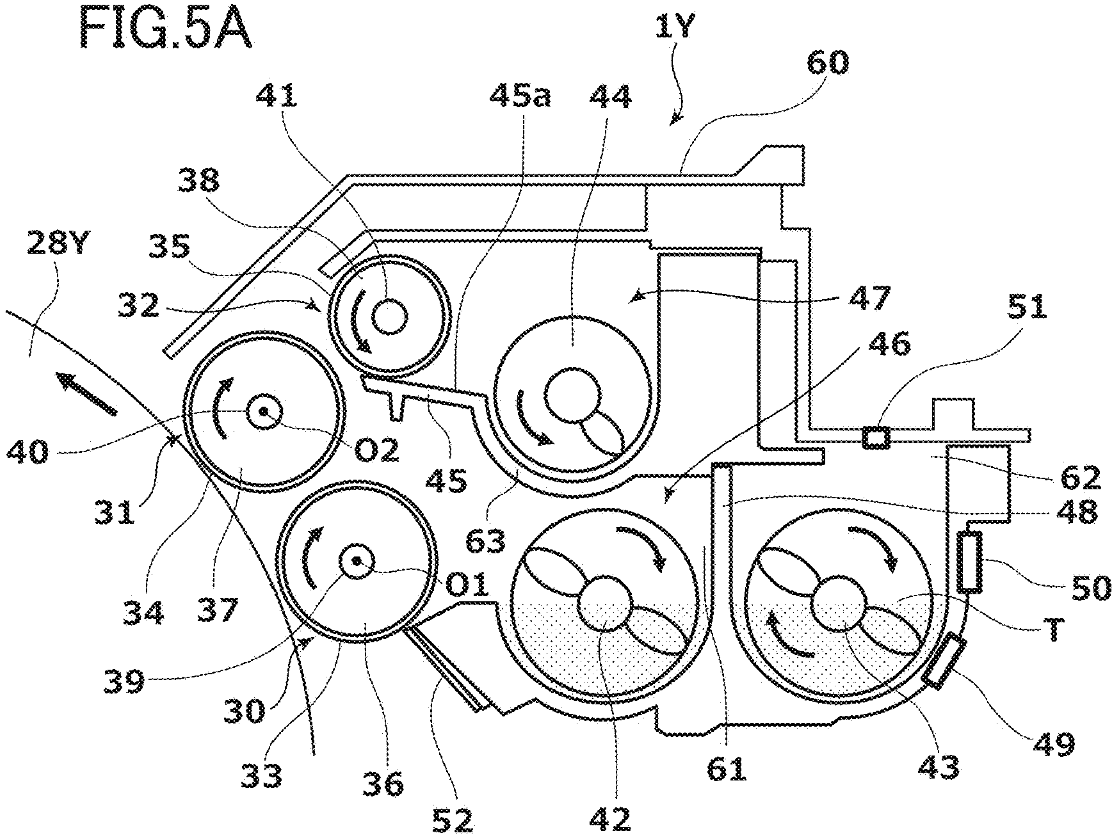
FIG. 5A is a schematic cross-sectional view illustrating the developing unit according to the first embodiment, where a developer surface is in an appropriate state.
Figure 5B:
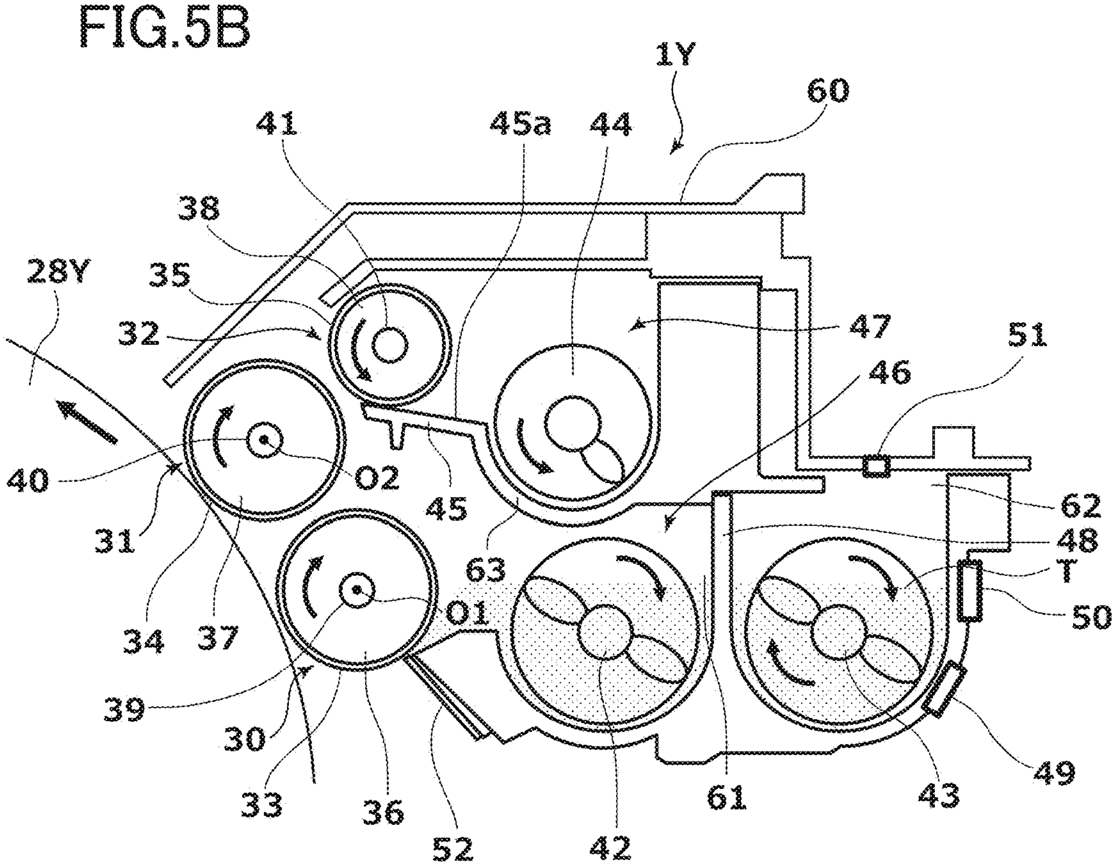
FIG. 5B is a schematic cross-sectional view illustrating the developing unit according to the first embodiment, where developer discharge is in a suppression state.

Incidentally, in the developing unit 1Y equipped with the ACR method like the present embodiment, for example, the discharge of the developer is suppressed by changes in fluidity of the developer due to the deterioration of the developer. Then, because the developer amount within the developing unit 1Y increases, the overflow of the developer near the first and second developing rollers 30 and 31 or the locking of various screws arranged in the developing unit 1Y may occur. FIG. 5A illustrates the developer surface T in a state in which the developer within the developing unit 1Y is maintained properly. Conversely, FIG. 5B illustrates the developer surface T in a state in which the developer discharge is suppressed.

To address such circumstances, in the present embodiment, the developer surface detection sensor 50 that detects the height of the developer surface within the developing unit 1Y is disposed, and, in a case where the developer surface within the developing unit 1Y deviates from a predetermined range, the developer discharge control to change the number of revolutions (the rotational speeds) of the developer supply screw 42 and the develop agitation screw 43 to maintain the developer surface within the predetermined range is performed. For example, in a case where the developer surface within the developing unit 1Y falls below a predetermined position, a developer discharge suppression mode to suppress the developer discharge by decreasing the rotational speeds of the developer supply screw 42 and the developer agitation screw 43 is performed. In addition, in a case where the developer surface within the developing unit 1Y surpasses the predetermined position, the image forming operation is stopped, and a developer discharge mode to discharge the excess developer to the outside of developing unit 1Y by repeating forward and reverse rotation operations of the developer supply screw 42 and the developer agitation screw 43 for a predetermined time is performed.

That is, rotational conditions of the developer supply screw 42 and the developer agitation screw 43 in the developer discharge mode are different from rotational conditions of the developer supply screw 42 and the developer agitation screw 43 during an operation of developing the electrostatic latent image formed on the photosensitive drum 28Y with the developer (hereinafter, referred to as a developing operation). In particular, when the developing unit 1Y performs the developing operation of developing the electrostatic latent image formed on the photosensitive drum 28Y, the driving unit 94 rotatably drives the developer supply screw 42 and the developer agitation screw 43 under a first rotational condition. On the other hand, as described below, in a case where the developer discharge mode is executed during a non-developing operation of not performing the developing operation, the driving unit 94 rotatably drives the developer supply screw 42 and the developer agitation screw 43 under a second rotational condition which is different from the first rotational condition. To be noted, the first rotational condition is, for example, a condition in which the driving unit 94 rotates the developer supply screw 42 and the developer agitation screw 43 in a first rotational direction (forward rotation). The second rotational condition is a condition in which the driving unit 94 repeatedly alternately rotates the developer supply screw 42 and the developer agitation screw 43 in the first rotational direction and a second rotational direction (reverse rotation) that is opposite to the first rotational direction. These developer discharge suppression mode and developer discharge mode are referred to as the developer discharge control.

False Detection of Developer Surface due to Toner Concentration

Figure 6:
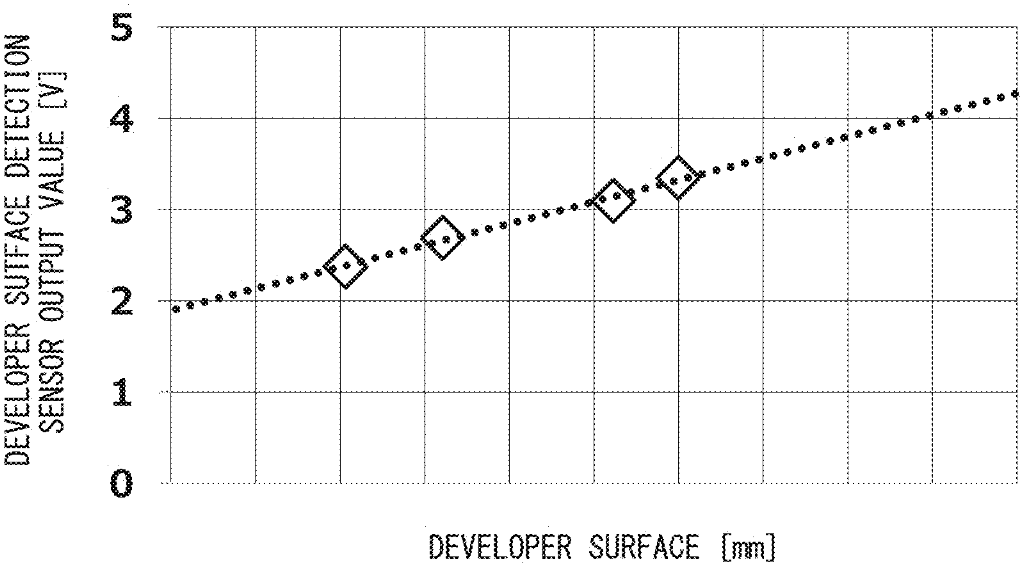
FIG. 6 is a graph illustrating a relationship between the developer surface and an output value of a developer surface detection sensor in the developing unit according to the first embodiment.

When performing this type of control, whether the developer surface within the developing unit 1Y is within the predetermined range is determined based on an output value of the developer surface detection sensor 50. However, in this case, there is a risk that the output value of the developer surface detection sensor 50 may fluctuate due to an influence of the toner concentration within the developing unit 1Y. In the present embodiment, the developer surface detection sensor 50 employs a sensor utilizing a magnetic permeability method. In FIG. 6, a relationship of the output value of the developer surface detection sensor 50 with respect to the developer surface within the developing unit 1Y is illustrated. The developer surface detection sensor 50 detects changes in an amount of the magnetic carrier present contained in the developer as changes in the magnetic permeability. Thereby, as the developer surface rises, higher magnetic permeability is led due to an increase in the magnetic carrier in the vicinity of the sensor, and the output value of the sensor increases. Conversely, as the developer surface drops and the magnetic carrier in the vicinity of the sensor decreases, the output value of the sensor decreases. Thus, the developer surface and the output value of the developer surface detection sensor 50 can be correlated to a primary linear relationship as illustrated in FIG. 6.

Figure 7:
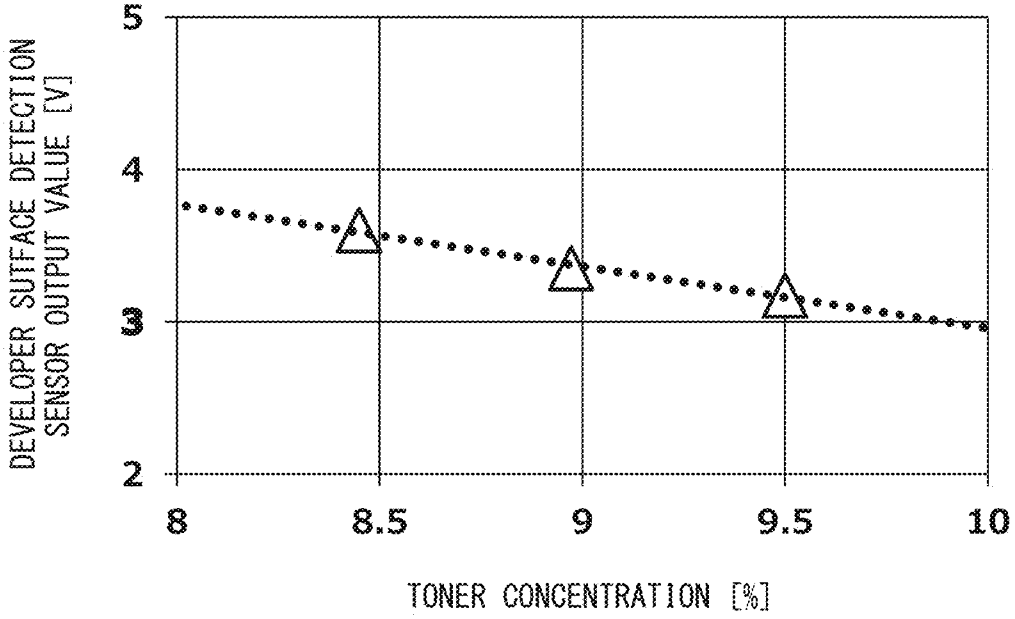
FIG. 7 is a graph illustrating a relationship between the toner concentration of the developer and the output value of a developer surface detection sensor in the developing unit according to the first embodiment.

On the other hand, it is known that, aside from the amount of the carrier present, the magnetic permeability of the developer also changes depending on the toner concentration. For example, if the toner concentration of the developer is low, the apparent magnetic permeability increases, and, conversely, if the toner concentration is high, the apparent magnetic permeability decreases. As a result, the output value of the developer surface detection sensor 50 is affected not only by the height of the developer surface but also by the toner concentration of the developer. FIG. 7 illustrates a relationship of the output value of the developer surface detection sensor 50 with respect to the toner concentration. FIG. 7 illustrates the influence of the toner concentration on the output value of the developer surface detection sensor 50 in a case where the height of the developer surface with respect to each toner concentration is identical. Accordingly, it is apparent that the output value of the developer surface detection sensor 50 decreases as the toner concentration increases.

Figure 8:
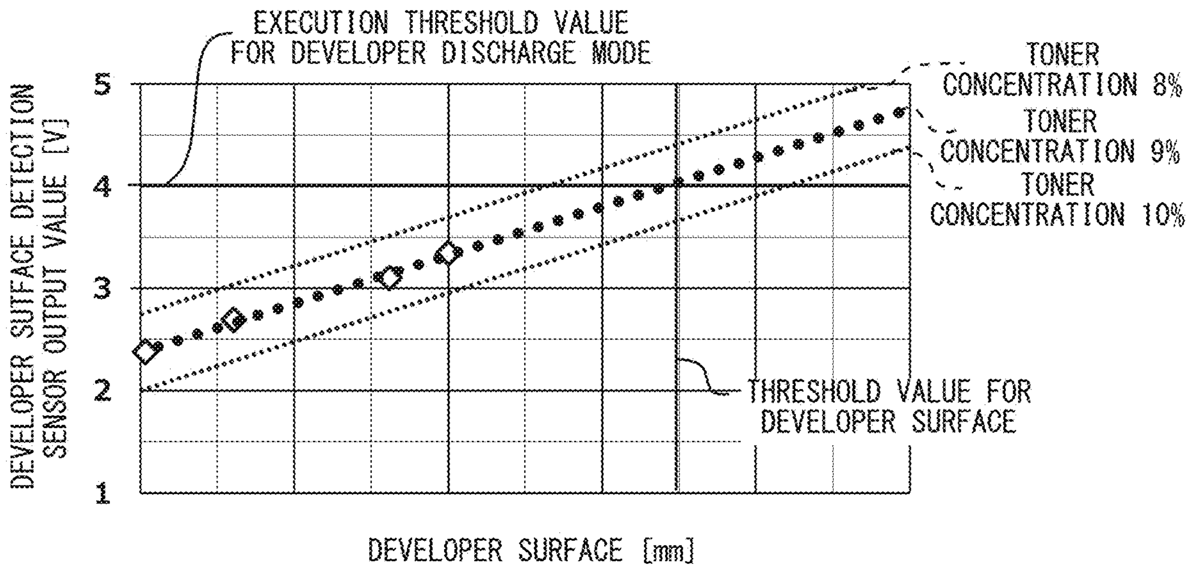
FIG. 8 is a graph illustrating changes in output characteristics of the developer surface detection sensor with respect to the toner concentration of the developer in the developing unit according to the first embodiment.

Because the developer surface detection sensor 50 is affected by the toner concentration as described above, as illustrated in FIG. 8, the output value of the developer surface detection sensor 50 with respect to the developer surface changes output characteristics depending on the toner concentration. FIG. 8 illustrates a threshold value of the developer surface within the developing unit 1Y, and the output value of the developer surface detection sensor 50 corresponding to the threshold value. The threshold value of the developer surface is an upper limit value of the range within which the developer amount within the developing unit 1Y is appropriate, and the output value of the developer surface detection sensor 50 corresponding to the threshold value is an execution threshold value (predetermined value) that is a threshold value for executing the developer discharge mode. In a case where an output value that is equal to or more than this threshold value is detected, the developer discharge mode is executed. That is, in the case where the output value of the developer surface detection sensor 50 becomes equal to or more than the predetermined value, the controller 80 can execute the developer discharge mode serving as a developer forced discharge operation to forcibly discharge the developer from the developer discharge portion 53.

While, in the present embodiment, the reference toner concentration within the developing unit 1Y is 9%, in this case, the execution threshold value for the developer discharge mode is 4 volts (V). However, for example, even when the toner concentration has increased to 10%, if the execution threshold value has remained to be at 4 V, the developer surface has already been surpassed the threshold. As described above, depending on the toner concentration within the developing unit 1Y, there is a risk that the developer surface detection sensor 50 falsely detects the developer surface. Therefore, depending on the toner concentration, there is a risk that the developer discharge mode for maintaining the developer surface within the appropriate range may not be executed properly.

Control in Accordance with Toner Concentration

Therefore, in the present embodiment, the execution threshold value that determines whether or not to execute the developer discharge mode (second control) based on the output value of the developer surface detection unit 50 is changed in accordance with the toner concentration within the developing unit 1Y, which is detected by the toner concentration sensor 49. That is, in a case where the toner concentration detected by the toner concentration sensor 49 is a first toner concentration (the output value of the toner concentration sensor 49 is a first value), the controller 80 sets the predetermined value (execution threshold value) to a first predetermined value (first threshold value), and, in a case where the toner concentration detected by the toner concentration sensor 49 is a second toner concentration that is larger than the first toner concentration (the output value of the toner concentration sensor 49 is a second value that is larger than the first value), the controller 80 sets the predetermined value to a second predetermined value (second threshold value that is larger than the first threshold value). Thereby, even in a case where there are fluctuations in the toner concentration within the developing unit 1Y, it becomes possible to execute the developer discharge mode properly.

In addition, the developer discharge mode is executed during a time of a non-image formation (i.e., during a non-developing operation in which the developing operation is not performed). The time of the non-image formation includes, for example, a period before a start of the image forming job, an interval between the image forming job and the subsequent image forming job, a period during an operation for image stabilization, periods during various operational corrections, and the like. Even during continuous image formation, it is acceptable to insert operation control to execute the developer discharge mode by stopping the image forming operation midway. To be noted, the image forming job refers to a period from the start of the image formation based on a print signal (image formation signal) for forming the image on the recording material to the completion of the image formation. That is, the image forming job refers to a period during which a series of operations: a pre-operation (pre-rotation) performed prior to the image forming operation triggered by the input of the image formation signal, the image forming operation, and a post-operation (post-rotation) performed after the image forming operation are performed.

Using a flowchart illustrated in FIG. 9, an execution procedure for the developer discharge mode will be described. At STEP S101, during the image forming operation or during the pre-rotation before the image formation, a process to determine whether or not to execute the developer discharge mode is started. At STEP S102, the toner concentration within the developing unit 1Y is detected by the toner concentration sensor 49. For the detection of the toner concentration, the output value can be, for example, stabilized by averaging the toner concentration over a rotation cycle of the developer agitation screw 43 in a sampling period that is equal to or more than the time required for one rotation of the developer agitation screw 43. That is, the output value of the toner concentration sensor 49 is, for example, determined as an average of the output value over a period that is an integer multiple of the rotation pitch time of the developer agitation screw 43.

At STEP S103, in accordance with the toner concentration within the developing unit 1Y detected at STEP S102, the execution threshold value for the developer discharge mode based on the output value of the developer surface detection sensor 50 is changed. The change in the execution threshold value for the developer discharge mode is performed by referring to a threshold value change coefficient corresponding to toner concentration segments, which is illustrated in FIG. 10.

This will be described. As illustrated in FIG. 7, even when the height of the developer surface is identical, the output value of the developer surface detection sensor 50 is affected by the toner concentration, and exhibits fluctuations that corelate with a primary linear relationship. In addition, in a case where the toner concentration within the developing unit 1Y has changed by ±1%, from FIG. 8, it is observed that, in accordance with such a change in the toner concentration, the execution threshold value for the developer discharge mode needs to be changed by approximately ±9%. Based on these relationships, it is possible to calculate a degree of appropriate adjustments to the execution threshold value for the developer discharge mode in accordance with the toner concentration within the developing unit 1Y. As such an example, in the present embodiment, a table of the threshold value change coefficient corresponding to the toner concentration segments in FIG. 10 is used.

Figure 11A:
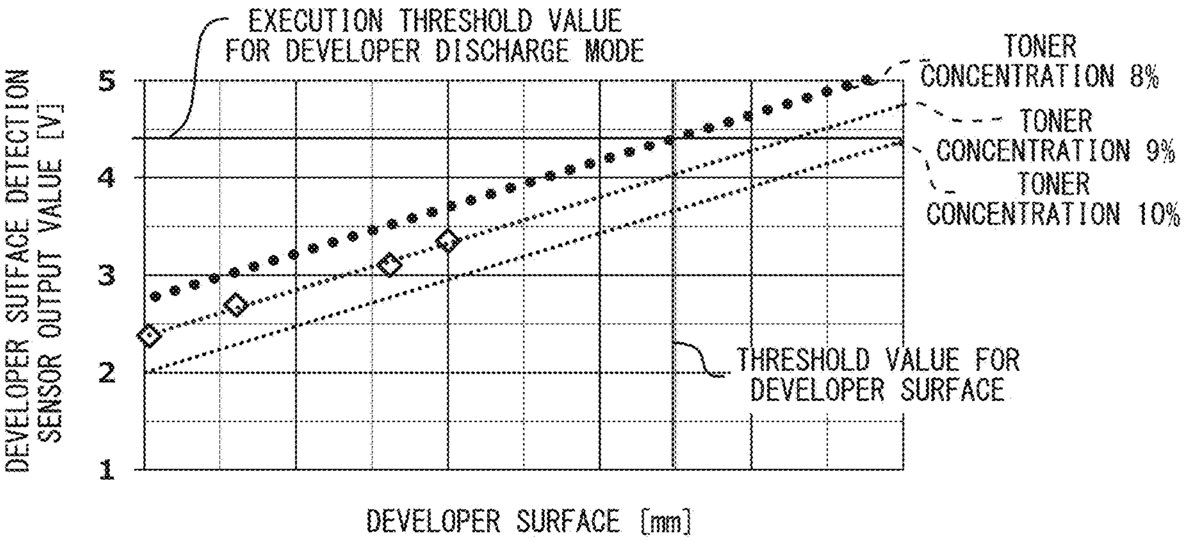
FIG. 11A is a graph illustrating an execution threshold value for the developer discharge mode in a case where the toner concentration of the developer is 8% in the developing unit according to the first embodiment.
Figure 11B:
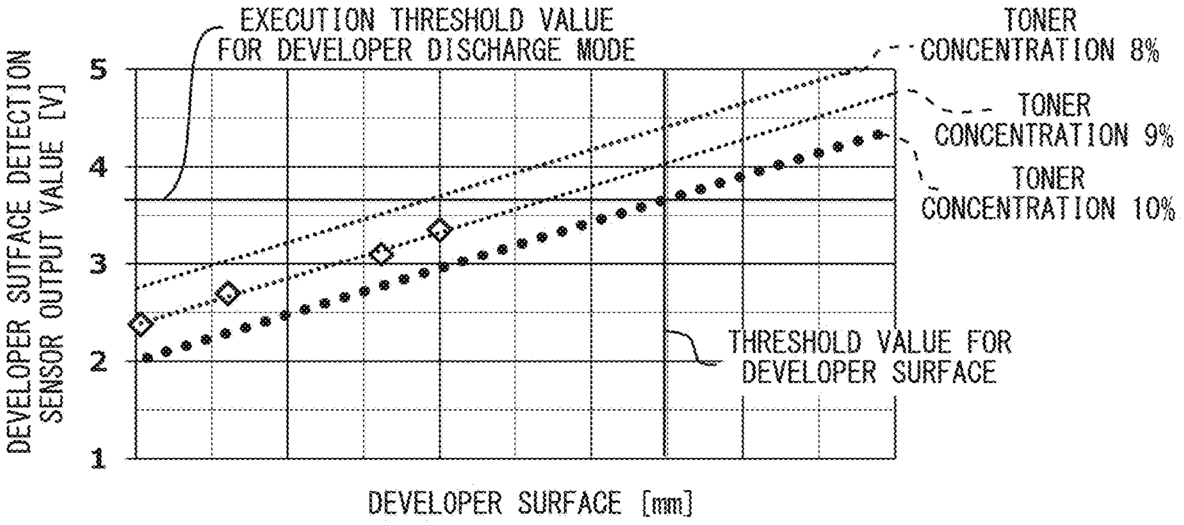
FIG. 11B is a graph illustrating the execution threshold value for the developer discharge mode in a case where the toner concentration of the developer is 10% in the developing unit according to the first embodiment.

The threshold value change coefficient in this table represents a coefficient used to determine the degree to which the execution threshold value for the developer discharge mode is changed in accordance with the toner concentration within the developing unit 1Y. Accordingly, for example, in a case where the toner concentration is 8%, the change coefficient for the execution threshold value becomes 1.09. In the present embodiment, since the reference value for the toner concentration is 9% and the execution threshold value for the developer discharge mode at that time is 4 V (refer to FIG. 8), the execution threshold value in the case where the toner concentration is 8% is changed to 4.4 V which is obtained by multiplying the execution threshold value of 4 V for the 9% toner concentration by 1.09 (refer to FIG. 11A). In addition, in a case where the toner concentration is 10%, the change coefficient for the execution threshold value becomes 0.91, and the execution threshold value after the change becomes 3.6 V (refer to FIG. 11B). That is, as illustrated in FIGS. 11A and 11B, in the case where the toner concentration is 10% (for example, corresponding to the first toner concentration), the execution threshold value is set to 3.6 V (for example, corresponding to the first predetermined value), and, in the case where the toner concentration is 8% (for example, corresponding to the second toner concentration), the execution threshold value is set to 4.4 V (for example, corresponding to the second predetermined value).

At STEP S104, the developer surface within the developing unit 1Y is detected by the developer surface detection sensor 50. For the detection of the developer surface, the output value can be, for example, stabilized by averaging the developer surface over the rotation cycle of the developer agitation screw 43 in a sampling period that is equal to or more than the time required for one rotation of the developer agitation screw 43. That is, the output value of the developer surface detection sensor 50 is, for example, determined as an average of the output value over a period that is an integer multiple of the rotation pitch time of the developer agitation screw 43. At STEP S105, whether or not the output value of the developer surface detection sensor 50 detected at STEP S104 is equal to or more than the execution threshold value for the developer discharge mode is determined. At this time, the execution threshold value that was changed in accordance with the toner concentration at STEP S103 is used as the execution threshold value for the developer discharge mode. For example, while the execution threshold value for the developer discharge mode becomes 4.4 V in the case where the toner concentration is 8%, if the output value of the developer surface detection sensor 50 detected at STEP S104 is equal to or more than 4.4 V (STEP S105: Yes), STEP S106 is performed, and, if the output value of the developer surface detection sensor 50 is less than 4.4 V (STEP S105: No), the control is ended by STEP S107.

At STEP S106, the developer discharge mode is executed. In this case, since the developer surface within the developing unit 1Y surpasses the predetermined range, if it is during the image forming operation, the image forming operation is interrupted, and, by repeatedly alternating the forward and reverse rotational operations of the developer supply screw 42 and the developer agitation screw 43 (second rotational condition) for the predetermined time, the operation to enhance the developer discharge is performed. Then, the controller 80 proceeds to STEP S107.

To be noted, when environmental humidity is low, the fluidity of the developer decreases compared to when the environmental humidity is high, and there is a tendency to hinder the developer discharge. Therefore, during the developer discharge mode at STEP S106, when repeatedly alternating the forward and reverse rotational operations of the developer supply screw 42 and the developer agitation screw 43 for the predetermined time, the number of revolutions (rotational speeds) of the developer supply screw 42 and the developer agitation screw 43 may be changed depending on the environmental humidity. That is, the second rotational condition may be set in accordance with the environmental humidity.

In particular, in the first rotational condition, the developer supply screw 42 and the developer agitation screw 43 rotate at a first rotational speed. In addition, in the second rotational condition, in a case where the environmental humidity is at first humidity, the developer supply screw 42 and the developer agitation screw 43 repeatedly alternate the forward and reverse rotation at a second rotational speed that is faster than the first rotational speed. On the other hand, in a case where the environmental humidity is at second humidity that is lower than the first humidity, it is acceptable to enhance the developer discharge by setting a rotational speed, at which the developer supply screw 42 and the developer agitation screw 43 repeatedly alternate the forward and reverse rotation for the predetermined time, to a third rotational speed that is faster than the second rotational speed. At this time, similarly, with respect to the developer collection screw 44, a rotational speed may be also increased.

In addition, as the rotational conditions of the developer supply screw 42 and the developer agitation screw 43 when executing the developer discharge mode at STEP S106, instead of repeatedly alternating the forward and reverse rotation of the developer supply screw 42 and the developer agitation screw 43 for the predetermined time, the following variant example may be applied.

For example, at STEP S106, it is acceptable to enhance the developer discharge by increasing the rotational speeds of the developer supply screw 42 and the developer agitation screw 43 during the execution of the developer discharge mode compared to the rotational speeds of the developer supply screw 42 and the developer agitation screw 43 during the developing operation. That is, it is acceptable to configure such that, in the first rotational condition, the developer supply screw 42 and the developer agitation screw 43 rotate at the first rotational speed, and, in the second rotational condition, the developer supply screw 42 and the developer agitation screw 43 rotate at the second rotational speed that is faster than the first rotational speed. At this time, similarly, with respect to the developer collection screw 44, the rotational speed may be also increased.

In addition, in this variant example, when executing the developer discharge mode at STEP S106, the number of revolutions (rotational speeds) of the developer supply screw 42 and the developer agitation screw 43 may be changed in accordance with the environmental humidity. This is because, as described above, when the environmental humidity is low, the fluidity of the developer is reduced compared to when the environmental humidity is high, and there is the tendency to hinder the developer discharge. Therefore, in particular, when the environmental humidity is low, the developer discharge may be enhanced by increasing the rotational speeds of the developer supply screw 42 and the developer agitation screw 43 during the execution of the developer discharge mode compared to when the environmental humidity is high. That is, it is acceptable to configure such that, when the environmental humidity is at the first humidity, the developer supply screw 42 and the developer agitation screw 43 rotate at the second rotational speed that is faster than the first rotational speed, and, when the environmental humidity is at the second humidity that is lower than the first humidity, the developer supply screw 42 and the developer agitation screw 43 rotate at the third rotational speed that is faster than the second rotational speed. At this time, similarly, with respect to the developer collection screw 44, the rotational speed may be also increased.

As described above, in the present embodiment, in accordance with the toner concentration detected by the toner concentration sensor 49 within the developing unit 1Y, the execution threshold value based on the developer surface detection sensor 50 for executing the developer discharge mode is changed. Thereby, regardless of the toner concentration of the developer, false detection by the developer surface detection sensor 50 that detects the developer surface can be suppressed, and it becomes possible to properly maintain the developer discharge and the developer surface. Then, it is possible to suppress the occurrence of the developer overflow and screw lock caused by an excess of the developer amount within the developing unit 1Y.

Second Embodiment

A second embodiment will be described with reference to FIGS. 12 to 14B. In the present embodiment, when executing the developer discharge suppression mode to suppress the developer discharge based on the detection result of the developer surface detection sensor 50, the execution threshold value for the developer discharge suppression mode is changed in accordance with the toner concentration detected by the toner concentration sensor 49. Since the other configurations and functions are similar to those in the first embodiment described above, by putting the same reference characters on the similar configurations, descriptions and illustrations will be omitted or simplified, and differences from the first embodiment will be mainly described below.

In the developing unit 1Y utilizing the ACR method as described in the first embodiment, there is a risk that a screw unevenness may occur due to the insufficient supply of the developer to the first and second developing rollers 30 and 31 caused by a decrease in the developer amount within the developing unit. The screw unevenness refers to a phenomenon where, in a case where the developer amount within the developing unit is insufficient, coating unevenness corresponding to a screw shape of the developer supply screw 42 occurs on the first or second developing roller 30 or 31 and image defects resulting from the coating unevenness are generated in the formed image.

Therefore, in the present embodiment, the developer surface within the developing unit 1Y is detected by the developer surface detection sensor 50, and, in a case where the detected developer surface falls below the predetermined range, the developer discharge suppression mode, in which a change in the number of revolutions (rotational speeds) of the developer supply screw 42 and the developer agitation screw 43 and the like are performed, is executed. That is, in a case where the output value of the developer surface detection sensor 50 becomes equal to or less than a predetermined value for discharge suppression, the controller 80 can execute the developer discharge suppression mode as a developer discharge suppression operation to suppress the developer amount discharged from the developer discharge portion 53.

For example, in the developer discharge suppression mode, the developer discharge is suppressed by decreasing the rotational speeds of the developer supply screw 42 and the developer agitation screw 43 during the time of the image formation and, thereby, reducing the developer amount that the developer supply screw 42 conveys to the developer discharge portion 53. That is, the rotational speeds of the developer supply screw 42 and the developer agitation screw 43 can be changed to a first speed (first rotational speed) and a second speed (second rotational speed) that is slower than the first speed, and, in the developer discharge suppression mode, the controller 80 sets the rotational speeds of the developer supply screw 42 and the developer agitation screw 43 to the second speed (second rotational speed). Then, the controller 80 rotatably drives the developer supply screw 42 and the developer agitation screw 43 at the second speed until the output value of the developer surface detection sensor 50 surpasses the predetermined value (execution threshold value for the developer discharge suppression mode). At this time, similarly, with respect to the developer collection screw 44, the rotational speed may be also decreased. In addition, the developer discharge suppression mode can be executed during the image forming operation, and, in this case, without being decelerated, the first and second developing rollers 30 and 31 and the peeling roller 32 are rotatably driven at the same speed as during the normal image forming operation. To be noted, in the developer discharge suppression mode, the developer supply screw 42 and the developer agitation screw 43 may be rotatably driven at the second speed for a predetermined time regardless of the output value of the developer surface detection sensor 50.

However, as described above, the output value of the developer surface detection sensor 50 fluctuates due to the influence of the toner concentration within the developing unit 1Y. Therefore, depending on the toner concentration, there is a risk that the developer discharge suppression mode for maintaining the developer surface within the proper range may not be appropriately executed.

Therefore, in the present embodiment, in accordance with the toner concentration detected by the toner concentration sensor 49, the execution threshold value for the developer discharge suppression mode (second control) based on the output value of the developer surface detection sensor 50 is changed. That is, in a case where the toner concentration detected by the toner concentration sensor 49 is a third toner concentration (or first toner concentration, a first value for the output value of the toner concentration sensor), the predetermined value (execution threshold value) for the discharge suppression is set to a predetermined value for first discharge suppression (or first predetermined value, first threshold value), and, in a case where the toner concentration detected by the toner concentration sensor 49 is a fourth toner concentration (or a second toner concentration, a second value larger than the first value for the output value of the toner concentration sensor 49), the predetermined value (execution threshold value) for the discharge suppression is set to a predetermined value for second discharge suppression (or a second predetermined value, a second threshold value that is larger than the first threshold value), which is larger than the predetermined value for the first discharge suppression. Thereby, it becomes possible to appropriately execute the developer discharge suppression mode without being affected by the toner concentration.

Figure 12:
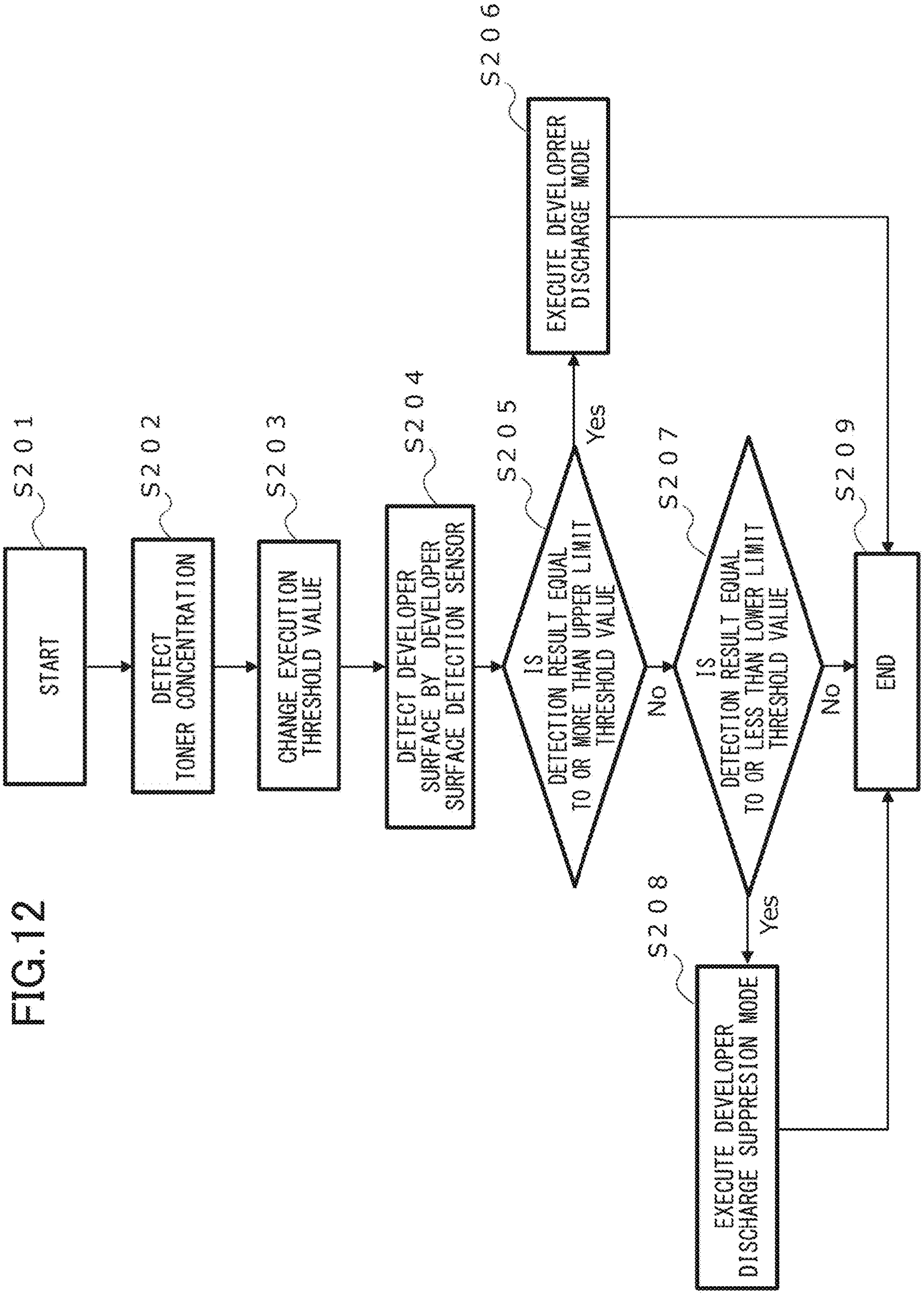
FIG. 12 is a control flowchart relating to the execution of the developer discharge mode and a developer discharge suppression mode according to a second embodiment.

Using FIG. 12, an execution procedure for the developer discharge suppression mode will be described. Since STEPS S201 and S202 are similar to the control processes at STEPS S101 and S102 described in FIG. 9, detailed descriptions will be omitted.

At STEP S203, in accordance with the toner concentration within the developing unit 1Y detected at STEP S202, the execution threshold values for the developer discharge mode and the developer discharge suppression mode are changed. While, in the first embodiment, only the execution threshold value for the developer discharge mode (hereinafter, also referred to as an upper limit threshold value) is changed, in the present embodiment, a modification to change the execution threshold value for the developer discharge suppression mode (hereinafter, also referred to as a lower limit threshold value) executed in the case where the developer surface falls below the predetermined range is added. The change of the execution threshold value for the developer discharge suppression mode is performed by referring to a lower limit threshold value change coefficient with respect to the toner concentration segments illustrated in FIG. 13. To be noted, while, in FIG. 13, an upper limit threshold value change coefficient is also illustrated, the upper limit threshold value change coefficient is the same as the threshold value change coefficient illustrated in FIG. 10. That is, regarding the method for changing the execution threshold value (upper limit threshold value) for the developer discharge mode, it is the same as in the first embodiment.

Figure 14A:
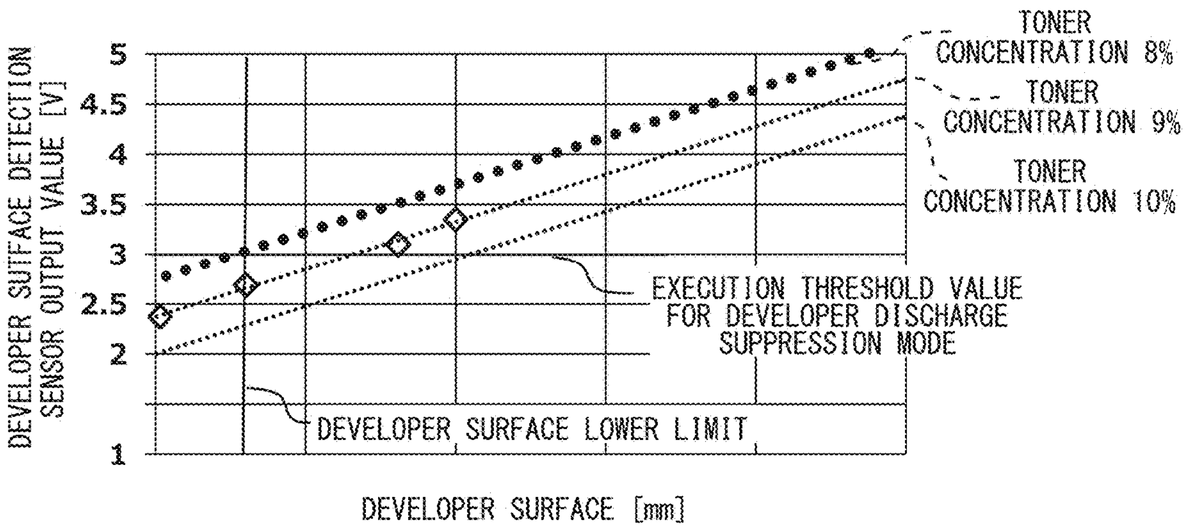
FIG. 14A is a graph illustrating an execution threshold value for the developer discharge suppression mode in a case where the toner concentration of the developer is 8% in the developing unit according to the second embodiment.
Figure 14B:
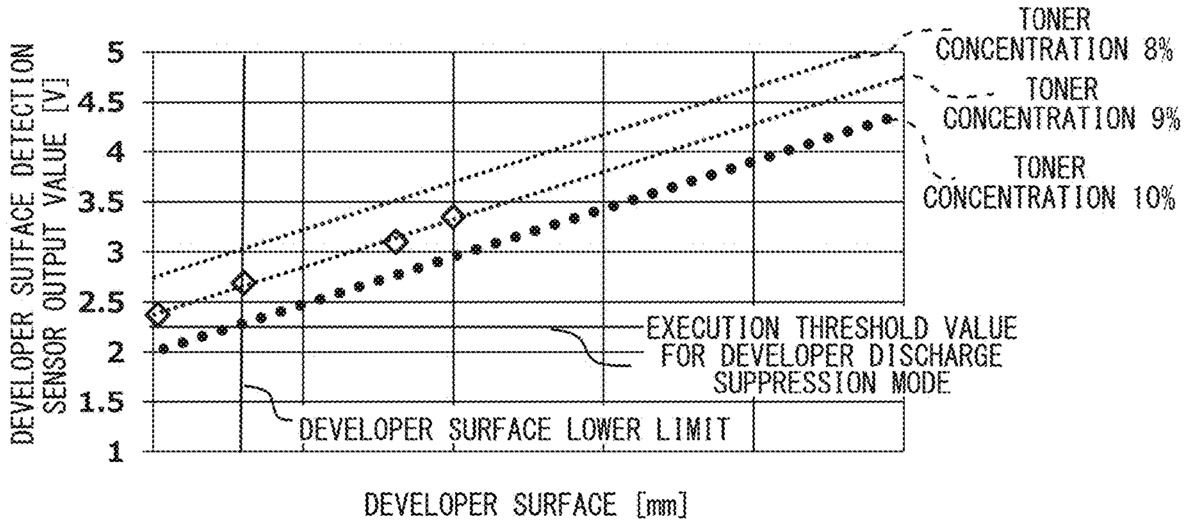
FIG. 14B is a graph illustrating the execution threshold value for the developer discharge suppression mode in a case where the toner concentration of the developer is 10% in the developing unit according to the second embodiment.

In addition, also regarding the method for changing the lower limit threshold value, it is similar to the method for changing the execution threshold value for the developer discharge mode described in the first embodiment. FIG. 14A illustrates the execution threshold value (lower limit threshold value) for the developer discharge suppression mode when the toner concentration is 8%, and FIG. 14B illustrates the execution threshold value (lower limit threshold value) for the developer discharge suppression mode when the toner concentration is 10%. From FIGS. 14A and 14B, it is observed that, in a case where the toner concentration changes by ±1%, in accordance with such a change, it is necessary to change the execution threshold value for the developer discharge suppression mode by approximately ±14%. In the present embodiment, as an example, a table of the lower limit threshold value change coefficient for the toner concentration segments illustrated in FIG. 13 is used.

The lower limit threshold value change coefficient in this table is a coefficient representing a degree to which the lower limit threshold is changed in accordance with the toner concentration within the developing unit 1Y. For example, in the case where the toner concentration is 8%, the lower limit threshold value change coefficient becomes 1.14, and in the case where the toner concentration is 10%, the lower limit threshold value change coefficient becomes 0.86. If the execution threshold value for the developer discharge suppression mode is 2.6 V when the toner concentration is 9%, which serves as the reference in the present embodiment, the lower limit threshold value for the case of the toner concentration at 8% is changed to 3.0 V by multiplying the lower limit threshold value of 2.6 V for the toner concentration at 9% by 1.14, and, for the case of the toner concentration at 10%, the lower limit threshold value is changed to 2.2 V. That is, as illustrated in FIGS. 14A and 14B, in the case where the toner concentration is 10% (for example, corresponding to the third toner concentration), the execution threshold value is set to 2.2 V (for example, corresponding to the predetermined value for the first discharge suppression), and, in the case where the toner concentration is 8% (for example, corresponding to the fourth toner concentration), the execution threshold value is set to 3.0 V (for example, corresponding to the predetermined value for the second discharge suppression).

Figure 9:
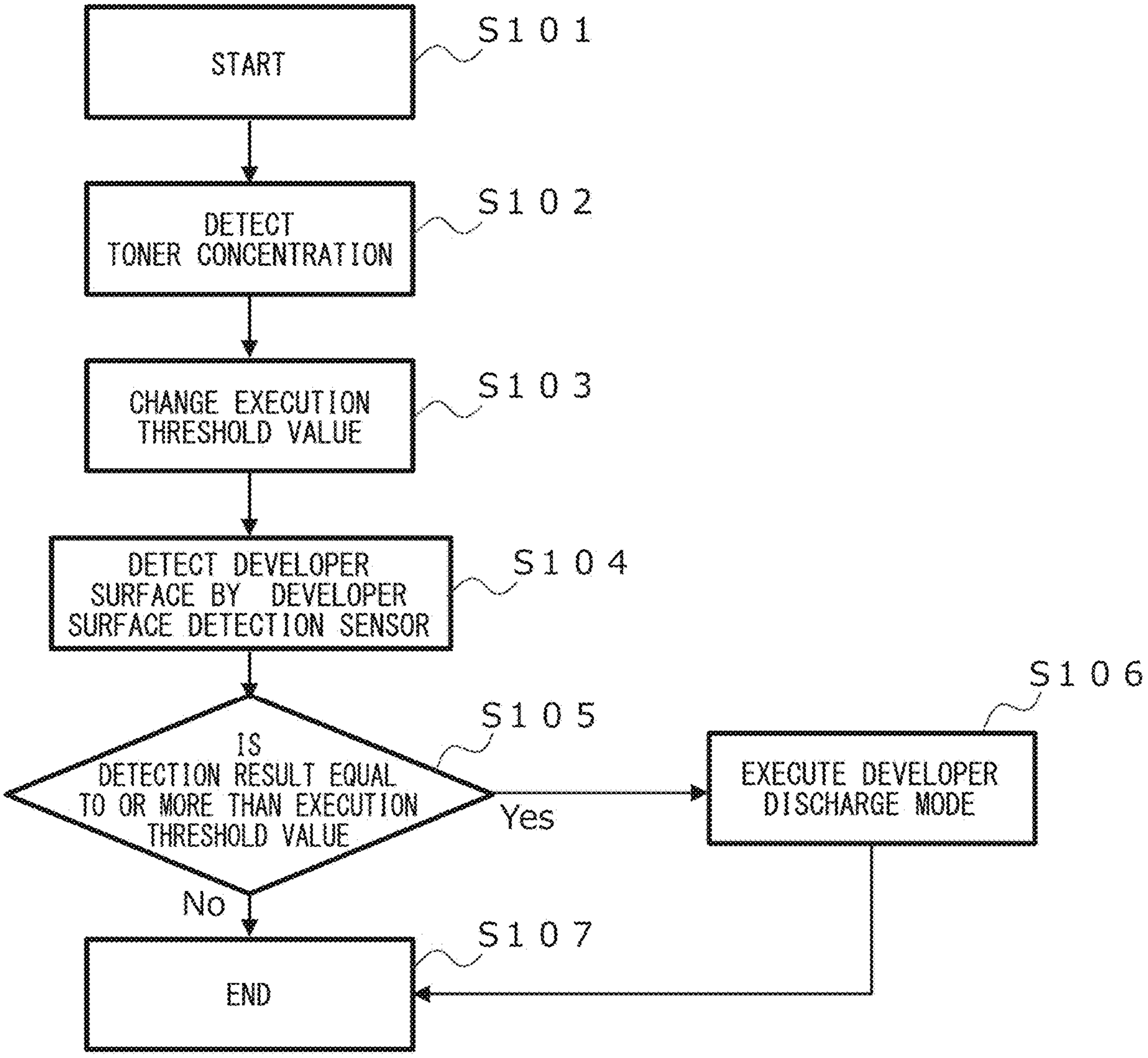
FIG. 9 is a control flowchart relating to the execution of a developer discharge mode according to the first embodiment.

Since, at STEPS S204 to S206, the control processes are the same as at STEPS S104 to S106 described in FIG. 9, details will be omitted. However, at STEP S205, if the output value of the developer surface detection sensor 50 is less than the upper limit threshold value (STEP S205: No), the controller 80 proceeds to STEP S207.

At STEP S207, whether or not the output value of the developer surface detection sensor 50 detected at STEP S204 is equal to or less than the lower limit threshold value is determined. At this time, the lower limit threshold value for the developer discharge suppression mode uses the lower limit threshold value changed at STEP S203. For example, while, in the case where the toner concentration within the developing unit 1Y is 8%, the lower limit threshold value for the developer discharge suppression mode becomes 3.0 V, if the output value of the developer surface detection sensor 50 detected at STEP S204 is equal to or less than 3.0 V (STEP S207: Yes), the controller 80 performs STEP S208, and, if the output value of the developer surface detection sensor 50 is larger than 3.0 V, the controller 80 ends the control by STEP S209.

At STEP S208, the developer discharge suppression mode is executed. Since, in this case, the developer surface within the developing unit 1Y falls below the predetermined range, the operation to suppress the developer discharge is performed by decelerating the rotational speeds (setting to the second speed) of the developer supply screw 42 and the developer agitation screw 43 during the time of the image formation and, thereby, reducing the developer amount that the developer supply screw 42 conveys to the developer discharge portion 53. Then the controller 80 proceeds to STEP S209.

To be noted, when the environmental humidity is high, the fluidity of the developer is increased compared to when the environmental humidity is low, and there is a tendency to enhance the discharge of the developer. Therefore, at STEP S208, the number of revolutions (rotational speeds) of the developer supply screw 42 and the developer agitation screw 43 during the execution of the developer discharge suppression mode may be changed depending on the environmental humidity. In particular, when the environmental humidity is high, the developer discharge may be suppressed by decreasing the rotational speeds of the developer supply screw 42 and the developer agitation screw 43 during the execution of the developer discharge suppression mode compared to when the environmental humidity is low. At this time, regarding the developer collection screw 44, similarly, the rotational speed may also be decreased.

To be noted, while, in the developer discharge suppression mode that is executed in the case where the developer surface within the developing unit 1Y falls below the predetermined range, the rotational speeds of the developer supply screw 42 and the developer agitation screw 43 are decreased during the time of the image formation (during the developing operation), it is not limited to this. In the case where the developer surface within the developing unit 1Y falls below the predetermined range, instead of executing the developer discharge suppression mode during the time of the image formation (during the developing operation), a variant example of executing the developer discharge suppression mode during the time of non-image formation (during a non-developing operation) is acceptable. In this variant example, the rotational conditions of the developer supply screw 42 and the developer agitation screw 43 in the developer discharge suppression mode are different from the rotational conditions of the developer supply screw 42 and the developer agitation screw 43 during the developing operation.

In particular, during the developing operation of developing the electrostatic latent image formed on the photosensitive drum 28Y, the driving unit 94 rotatably drives the developer supply screw 42 and the developer agitation screw 43 under a first rotational condition. On the other hand, in a case of executing the developer discharge suppression mode during the non-developing operation of not performing the developing operation, the driving unit 94 rotatably drives the developer supply screw 42 and the developer agitation screw 43 under a second rotational condition that is different from the first rotational condition. In the developer discharge suppression mode, the first rotational condition is to rotate the developer supply screw 42 and the developer agitation screw 43 at a first rotational speed, and the second rotational condition is to rotate the developer supply screw 42 and the developer agitation screw 43 at a second rotational speed that is slower than the first rotational speed. In addition, in the case where the developer surface within the developing unit 1Y falls below the predetermined range, the developer discharge suppression mode may be executed not only during the time of the image formation (during the developing operation) but also during the time of the non-image formation (during the non-developing operation), as a variant example.

As described above, in the present embodiment, the lower limit threshold value based on the detection result of the developer surface detection sensor 50 for executing the developer discharge suppression mode is changed in accordance with the toner concentration detected by the toner concentration sensor 49 within the developing unit 1Y. Thereby, regardless of the toner concentration of the developer, the false detection of the developer surface detection sensor 50 that detects the developer surface can be suppressed, and it becomes possible to appropriately maintain the developer discharge and the developer surface. Then, it is possible to suppress the occurrence of the image defects such as the screw unevenness caused by the decrease in the developer amount within the developing unit 1Y.

OTHER EMBODIMENTS

While, in the embodiments described above, the developing unit includes two developing rollers, a present disclosure can be applied to a configuration in which the number of developing roller is one. That is, the present disclosure can be applied to a configuration even if the number of developing rollers for developing the electrostatic latent image on an image bearing member such as a photosensitive drum is one, and an induction sensor for detecting the developer surface within a developing container and an induction sensor for detecting the toner concentration are included.

The present disclosure is not limited to the configuration of each embodiment described above. For example, the image forming apparatus 100 is not limited to the MFP, and may be a copier, a printer, or a facsimile apparatus. In addition, as long as it is possible to convey the developer, the configurations of the developer supply screw 42, the developer agitation screw 43, and the developer collection screw 44 are not specifically limited. For example, helical blades or paddle blades can be applied.

In addition, while, in the embodiments described above, the first sleeve 33 and the photosensitive drum 28Y rotate in the same direction at the positions facing each other and the second sleeve 34 and the photosensitive drum 28Y rotate in the same direction at the positions facing each other, it is not limited to this. The present disclosure may be applied to a configuration in which the rotation center O2 of the second developing roller 31 is arranged vertically above the rotation center O1 of the first developing roller 30, the first sleeve 33 and the photosensitive drum 28Y may rotate in directions opposite to each other at the positions facing each other, and the second sleeve 34 and the photosensitive drum 28Y may rotate in directions opposite to each other at the positions facing each other. That is, the present disclosure can be applied to a counter development configuration in which the photosensitive drum 28 rotates from above toward below in the vertical direction at the positions facing the first and second development rollers 30 and 31. In addition, in a case where equal to or more than three developing rollers are included, it is also possible to apply the present disclosure to any two of the developing rollers.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-218772, filed Dec. 26, 2023, and Japanese Patent Application No. 2024-187308, filed Oct. 24, 2024 which are hereby incorporated by reference herein in their entirety.

What is claimed is:

1. An image forming apparatus comprising:

an image bearing member;

a developing unit including a developer bearing member configured to bear developer that contains toner and carrier for developing an electrostatic latent image formed on the image bearing member, a developing container configured to accommodate the developer that is supplied to the developer bearing member, a conveyance screw configured to convey the developer accommodated in the developing container, a developer discharge portion configured to discharge part of the developer accommodated in the developing container, a first magnetic permeability sensor including a first detection portion configured to detect magnetic permeability of the developer accommodated in the developer container, and a second magnetic permeability sensor including a second detection portion configured to detect the magnetic permeability of the developer accommodated in the developer container;

a developer replenishment unit configured to replenish the developer to the developing container;

a driving unit configured to rotatably drive the conveyance screw under a first rotational condition when the developing unit performs a developing operation to develop the electrostatic latent image formed on the image bearing member; and a controller, wherein the second detection portion is located vertically above the first detection portion, wherein the controller is configured to execute first control to control the developer replenishment unit to replenish the developer to the developing container based on an output value of the first magnetic permeability sensor that is generated while the driving unit rotatably drives the conveyance screw, and wherein the controller is configured to execute second control to control the driving unit such that the driving unit rotatably drives the conveyance screw under a second rotational condition, which is different from the first rotational condition, during a non-developing operation, in which the developing operation is not performed, based on the output value of the first magnetic permeability sensor that is generated while the driving unit rotatably drives the conveyance screw and an output value of the second magnetic permeability sensor that is generated while the driving unit rotatably drives the conveyance screw.

2. The image forming apparatus according to claim 1, wherein the first rotational condition is a condition in which the driving unit rotates the conveyance screw in a first rotational direction, and wherein the second rotational condition is a condition in which the driving unit repeatedly alternately rotates the conveyance screw in the first rotational direction and a second rotational direction that is opposite to the first rotational direction.

3. The image forming apparatus according to claim 1, wherein the first rotational condition is a condition in which the driving unit rotates the conveyance screw in a first rotational direction, and wherein, in a case where environmental humidity is at first humidity, the second rotational condition is a condition in which the driving unit repeatedly alternately rotates the conveyance screw in the first rotational direction at a first rotational speed and the conveyance screw in a second rotational direction opposite to the first rotational direction at the first rotational speed, and, in a case where the environmental humidity is at second humidity that is lower than the first humidity, the second rotational condition is a condition in which the driving unit repeatedly alternately rotates the conveyance screw in the first rotational direction at a second rotational speed faster than the first rotational speed and the conveyance screw in the second rotational direction at the second rotational speed.

4. The image forming apparatus according to claim 1, wherein the first rotational condition is a condition in which the driving unit rotates the conveyance screw at a first rotational speed, and wherein the second rotational condition is a condition in which the driving unit rotates the conveyance screw at a second rotational speed that is faster than the first rotational speed.

5. The image forming apparatus according to claim 1, wherein the first rotational condition is a condition in which the driving unit rotates the conveyance screw at a first rotational speed, and wherein, in a case where environmental humidity is at first humidity, the second rotational condition is a condition in which the driving unit rotates the conveyance screw at a second rotational speed that is faster than the first rotational speed, and, in a case where the environmental humidity is at second humidity that is lower than the first humidity, the second rotational condition is a condition in which the driving unit rotates the conveyance screw at a third rotational speed that is faster than the second rotational speed.

6. The image forming apparatus according to claim 1, wherein the first rotational condition is a condition in which the driving unit rotates the conveyance screw at a first rotational speed, and wherein the second rotational condition is a condition in which the driving unit rotates the conveyance screw at a second rotational speed that is slower than the first rotational speed.

7. The image forming apparatus according to claim 1, wherein the first detection portion and the second detection portion are arranged within a range of a distance corresponding to four pitches of a blade of the conveyance screw in a developer conveyance direction in which the conveyance screw conveys the developer.

8. An image forming apparatus comprising:

an image bearing member;

a developing unit including a developer bearing member configured to bear developer that contains toner and carrier for developing an electrostatic latent image formed on the image bearing member, a developing container configured to accommodate the developer that is supplied to the developer bearing member, a conveyance screw configured to convey the developer accommodated in the developing container, a developer discharge portion configured to discharge part of the developer accommodated in the developing container, a first magnetic permeability sensor including a first detection portion configured to detect magnetic permeability of the developer accommodated in the developer container, and a second magnetic permeability sensor including a second detection portion configured to detect the magnetic permeability of the developer accommodated in the developer container;

a developer replenishment unit configured to replenish the developer to the developing container;

a driving unit configured to rotatably drive the conveyance screw under a first rotational condition when the developing unit performs a developing operation to develop the electrostatic latent image formed on the image bearing member; and a controller, wherein the second detection portion is located vertically above the first detection portion, wherein the controller is configured to execute first control to control the developer replenishment unit to replenish the developer to the developing container based on an output value of the first magnetic permeability sensor that is generated while the driving unit rotatably drives the conveyance screw, and wherein, in a case where the output value of the first magnetic permeability sensor that is generated while the driving unit rotatably drives the conveyance screw, is a first value and an output value of the second magnetic permeability sensor that is generated while the driving unit rotatably drives the conveyance screw, is equal to or more than a first threshold value, the controller is configured to execute second control to control the driving unit such that the driving unit rotatably drives the conveyance screw under a second rotational condition, which is different from the first rotational condition, during a non-developing operation in which a developing operation is not performed, in a case where the output value of the first magnetic permeability sensor that is generated while the driving unit rotatably drives the conveyance screw, is the first value, and the output value of the second magnetic permeability sensor that is generated while the driving unit rotatably drives the conveyance screw is less than the first threshold value, the controller is configured not to execute the second control, in a case where the output value of the first magnetic permeability sensor that is generated while the driving unit rotatably drives the conveyance screw, is a second value that is larger than the first value, and the output value of the second magnetic permeability sensor that is generated while the driving unit rotatably drives the conveyance screw, is equal to or more than a second threshold value that is larger than the first threshold value, the controller is configured to execute the second control, and, in a case where the output value of the first magnetic permeability sensor that is generated while the driving unit rotatably drives the conveyance screw is the second value, and the output value of the second magnetic permeability sensor that is generated while the driving unit rotatably drives the conveyance screw is less than the second threshold value, the controller is configured not to execute the second control.

9. The image forming apparatus according to claim 8, wherein the first rotational condition is a condition in which the driving unit rotates the conveyance screw in a first rotational direction, and wherein the second rotational condition is a condition in which the driving unit rotates repeatedly alternately rotates the conveyance screw in the first rotational direction and a second rotational direction that is opposite to the first direction.

10. The image forming apparatus according to claim 8, wherein the first rotational condition is a condition in which the driving unit rotates the conveyance screw in a first rotational direction, and wherein, in a case where environmental humidity is at first humidity, the second rotational condition is a condition in which the driving unit rotates repeatedly alternately rotates the conveyance screw in the first rotational direction at a first rotational speed and the conveyance screw in a second rotational direction opposite to the first rotational direction at the first rotational speed, and, in a case where the environmental humidity is at second humidity lower than the first humidity, the second rotational condition is a condition in which the driving unit rotates repeatedly alternately rotates the conveyance screw in the first rotational direction at a second rotational speed faster than the first rotational speed and the conveyance screw in the second rotational direction at the second rotational speed.

11. The image forming apparatus according to claim 8, wherein the first rotational condition is a condition in which the driving unit rotates the conveyance screw at a first rotational speed, and wherein the second rotational condition is a condition in which the driving unit rotates the conveyance screw at a second rotational speed that is faster than the first rotational speed.

12. The image forming apparatus according to claim 8, wherein the first rotational condition is a condition in which the driving unit rotates the conveyance screw at a first rotational speed, and wherein, in a case where environmental humidity is at first humidity, the second rotational condition is a condition in which the driving unit rotates the conveyance screw at a second rotational speed that is faster than the first rotational speed, and, in a case where the environmental humidity is at second humidity that is lower than the first humidity, the second rotational condition is a condition in which the driving unit rotates the conveyance screw at a third rotational speed that is faster than the second rotational speed.

13. The image forming apparatus according to claim 8, wherein the first detection portion and the second detection portion are arranged within a range of a distance corresponding to four pitches of a blade of the conveyance screw in a developer conveyance direction in which the conveyance screw conveys the developer.

14. An image forming apparatus comprising:

an image bearing member;

a developing unit including a developer bearing member configured to bear developer that contains toner and a carrier for developing an electrostatic latent image formed on the image bearing member, a developing container configured to accommodate the developer that is supplied to the developer bearing member, a conveyance screw configured to convey the developer accommodated in the developing container, a developer discharge portion configured to discharge part of the developer accommodated in the developing container, a first magnetic permeability sensor including a first detection portion configured to detect magnetic permeability of the developer accommodated in the developer container, and a second magnetic permeability sensor including a second detection portion configured to detect the magnetic permeability of the developer accommodated in the developer container;

a developer replenishment unit configured to replenish the developer to the developing container;

a driving unit configured to rotatably drive the conveyance screw; and a controller, wherein the second detection portion is located vertically above the first detection portion, wherein the controller is configured to control the developer replenishment unit to replenish the developer to the developing container based on an output value of the first magnetic permeability sensor that is generated while the driving unit rotatably drives the conveyance screw, and wherein, in a case where the output value of the first magnetic permeability sensor that is generated while the driving unit rotatably drives the conveyance screw, is a first value, and an output value of the second magnetic permeability sensor that is generated while the driving unit rotatably drives the conveyance screw, is equal to or less than a first threshold value, the controller is configured to control the driving unit such that the driving unit rotatably drives the conveyance screw at a second rotational speed that is slower than a first rotational speed during a developing operation in which the developing unit develops the electrostatic latent image formed on the image bearing member, in a case where the output value of the first magnetic permeability sensor that is generated while the driving unit rotatably drives the conveyance screw, is the first value, and the output value of the second magnetic permeability sensor that is generated while the driving unit rotatably drives the conveyance screw, is larger than the first threshold value, the controller is configured to control the driving unit such that the driving unit rotatably drives the conveyance screw at the first rotational speed during the developing operation, in a case where the output value of the first magnetic permeability sensor that is generated while the driving unit rotatably drives the conveyance screw, is a second value that is larger than the first value, and the output value of the second magnetic permeability sensor that is generated while the driving unit rotatably drives the conveyance screw, is equal to or less than a second threshold value that is larger than the first threshold value, the controller is configured to control the driving unit such that the driving unit rotatably drives the conveyance screw at the second rotational speed during the developing operation, and, in a case where the output value of the first magnetic permeability sensor that is generated while the driving unit rotatably drives the conveyance screw, is the second value, and the output value of the second magnetic permeability sensor that is generated while the driving unit rotatably drives the conveyance screw, is larger than the second threshold value, the controller is configured to control the driving unit such that the driving unit rotatably drives the conveyance screw at the first rotational speed.

15. The image forming apparatus according to claim 14, wherein the first detection portion and the second detection portion are arranged within a range of a distance corresponding to four pitches of a blade of the conveyance screw in a developer conveyance direction in which the conveyance screw conveys the developer.

* * * * *